Jan. 23, 1962  J. K. MIDDAUGH  3,018,334
AUTOMATIC TRAFFIC SAMPLER AND RECORDER
Filed Oct. 31, 1956  20 Sheets-Sheet 1

INVENTOR
J. K. MIDDAUGH
BY
Harold C. Herman
ATTORNEY

Jan. 23, 1962   J. K. MIDDAUGH   3,018,334
AUTOMATIC TRAFFIC SAMPLER AND RECORDER
Filed Oct. 31, 1956   20 Sheets-Sheet 3

INVENTOR
J. K. MIDDAUGH
BY Harold C. Herman
ATTORNEY

Jan. 23, 1962  J. K. MIDDAUGH  3,018,334
AUTOMATIC TRAFFIC SAMPLER AND RECORDER
Filed Oct. 31, 1956  20 Sheets-Sheet 8

INVENTOR
J. K. MIDDAUGH
BY
Harold C. Herman
ATTORNEY

Jan. 23, 1962     J. K. MIDDAUGH     3,018,334
AUTOMATIC TRAFFIC SAMPLER AND RECORDER
Filed Oct. 31, 1956     20 Sheets-Sheet 10

INVENTOR
J. K. MIDDAUGH
BY
Harold C. Herman
ATTORNEY

Jan. 23, 1962  J. K. MIDDAUGH  3,018,334
AUTOMATIC TRAFFIC SAMPLER AND RECORDER
Filed Oct. 31, 1956  20 Sheets-Sheet 13

INVENTOR
J. K. MIDDAUGH
BY
Harold C. Herman
ATTORNEY

INVENTOR
J. K. MIDDAUGH

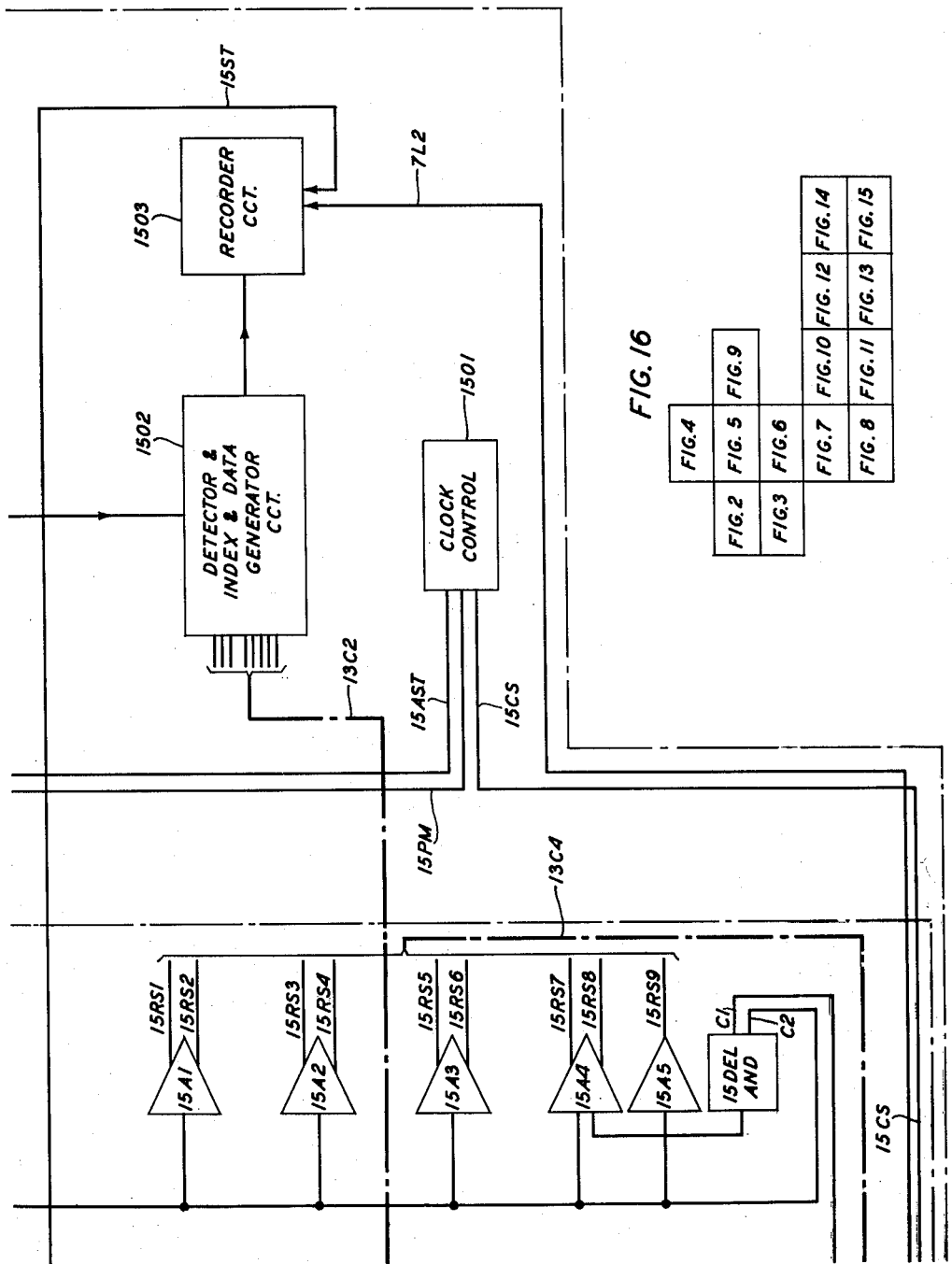

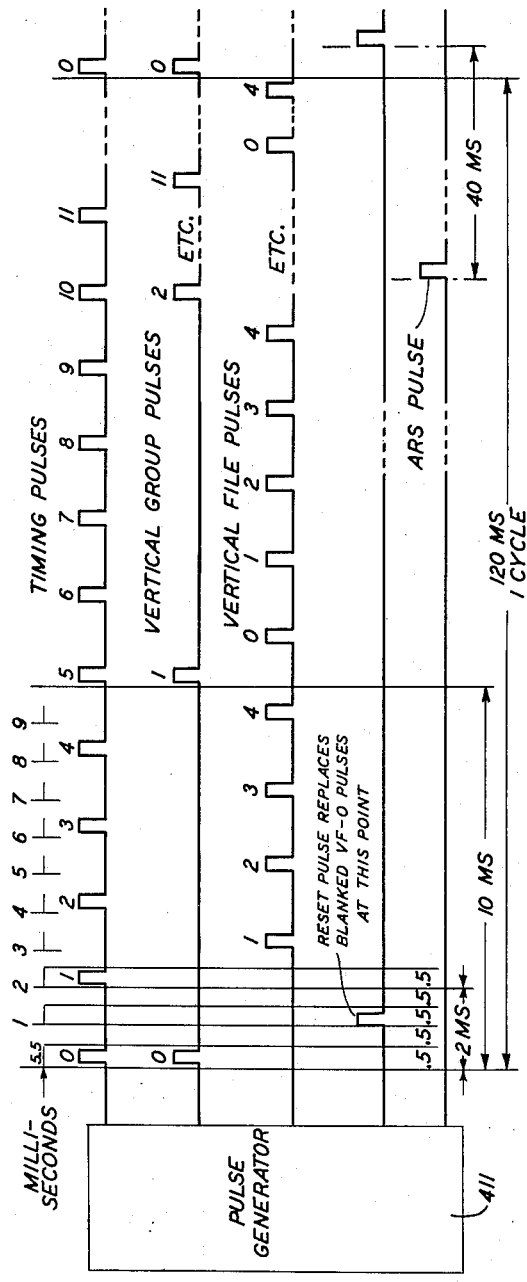

Jan. 23, 1962  J. K. MIDDAUGH  3,018,334
AUTOMATIC TRAFFIC SAMPLER AND RECORDER
Filed Oct. 31, 1956  20 Sheets-Sheet 17

INVENTOR
J. K. MIDDAUGH
BY Harold C. Herman
ATTORNEY

United States Patent Office 3,018,334
Patented Jan. 23, 1962

3,018,334
AUTOMATIC TRAFFIC SAMPLER AND RECORDER
Jack K. Middaugh, Metuchen, N.J., assignor to Bell Telephone Laboratories, Incorporated, New York, N.Y., a corporation of New York
Filed Oct. 31, 1956, Ser. No. 619,424
24 Claims. (Cl. 179—8)

This invention relates to automatic telephone traffic recorder equipment and more particularly to traffic recorder equipment for use in line concentrator telephone systems.

It is a general object of this invention to provide for traffic sampling and recording facilities for subscriber lines in a line concentrator telephone system.

In automatic telephone switching systems it is desirable to determine the busy and idle conditions of the various lines, trunks and circuits in order to provide optimum service consistent with economy of operation. The traffic information is utilized to determine how many trunks, circuits and switching devices are needed to handle a given volume of traffic without reducing the quality of telephone service. When the subscriber lines terminate at the central office it is a relatively simple matter to provide for the automatic sampling and recording of the busy and idle conditions of the lines because direct connections can readily be provided to the subscriber lines. In line concentrator telephone systems, however, a large number of subscriber lines terminate in a line concentrator which is connected by a small number of concentrator trunks to the central office. The central office is not directly in information communication with the subscriber lines due to the interposition of the remote line concentrator so that direct connections, at the central office, to the subscriber lines are impossible.

Line concentrator systems effect considerable savings in the cost of operation of the telephone plant by avoiding the necessity of providing a separate direct connection from the central office to each subscriber line. The greater the ratio of subscriber lines to concentrator trunks, without loss of telephone service, the greater are the savings.

Another object of this invention is to avoid the necessity of utilizing separate or additional concentrator trunks for sampling and recording traffic conditions in a concentrator system.

A further object of this invention is to provide traffic sampling and recording equipment for line concentrator telephone systems without reducing the quality of the telephone service provided to the subscriber lines.

In line concentrator systems of the type described in the patent 2,812,385 granted on November 5, 1957 to Joel-Krom-Posin, a scanning system is utilized which cyclically scans the subscriber lines to determine idle, busy or service request conditions thereof. The scanning system determines the service condition of the lines and supplies indications thereof to the central office.

A further object of this invention is to avoid the provision of a separate scanning system for the traffic recording equipment.

A further object of this invention is to sample and record line concentrator traffic conditions without interfering with terminating calls and without materially delaying originating calls.

In an illustrative embodiment of this invention the foregoing objects are accomplished by the provision of traffic sampling and recording equipment which is located at the central office. The traffic sampling and recording equipment is utilized to sample and record traffic conditions of a line concentrator telephone system. The line concentrator system includes a line scanning system which is shared by the traffic sampling and recording equipment. The line scanning system is utilized in the concentrator system to cyclically scan a number of subscriber lines connected to remote line concentrators. The scanning system provides an indication of the idle, service request, or busy condition of the subscriber lines to the central office. Control circuits in the central office receive the service request indications and initiate a sequence of operation for supplying dial tone to a service requesting line. The traffic sampling and recording equipment includes a scan control circuit which periodically inhibits the concentrator control circuits from recognizing service requests and which effectively seizes the concentrator scanning system for sampling the traffic conditions on the subscriber lines during the inhibition interval.

A feature of this invention relates to means for periodically inhibiting the recognition of service requests originating at the concentrator subscriber lines.

Another feature of this invention pertains to the utilization of the line scanning system by the traffic sampling and recording equipment. A mutual lockout is provided between serving originating calls and sampling traffic conditions. The scanning system is shared in this manner by the line concentrator system and the traffic recording equipment.

Still another feature of this invention pertains to circuit means for sampling and recording the traffic conditions of a line concentrator system without interfering with terminating calls and without materially delaying originating calls. The line scanning system cyclically and continuously determines which lines are requesting service so that a small delay in serving originating calls in order to sample and record the traffic conditions does not interfere with the quality of the telephone service. Terminating calls interrupt the sampling and recording sequence of operation.

A further feature of this invention relates to means for determining and recording the time required to connect dial tone to a service requesting subscriber line. When a service request indication is received at the concentrator control circuits, the traffic recorder scan control is inhibited from initiating a sampling sequence and it also initiates a dial-tone speed measurement sequence.

A further feature of this invention relates to circuit means for determining and recording the busy or idle conditions of the concentrator trunks connecting a concentrator to the central office. The periodic sampling sequence initiated at the traffic recorder scan control includes a line and a trunk scan. When the concentrator trunks are scanned intraconcentrator calls are distinguished by determining that two concentrator trunks are interconnected in a talking connection.

A further feature of this invention pertains to the provision of a superaudible tone to the concentrator trunks as they become busy. The presence or absence of the tone on a trunk when it is scanned determines whether or not the trunk is busy for an intraconcentrator call.

Further objects and features will become apparent to those skilled in the art upon consideration of the following description taken in conjunction with the drawings wherein:

FIG. 1 is a functional diagram or general circuit representation of the line concentrator system and the traffic recorder;

FIGS. 2 through 15, when arranged in accordance with FIG. 16, are a detailed circuit representation of the traffic recording system including a skeletonized version of a line concentrator system wherein:

FIGS. 2 and 3 illustrate one of the line concentrators;

FIGS. 4, 5, 6 and 9 illustrate the central office concentrator control equipment; and FIGS. 7, 8 and 10 through 15 illustrate the traffic recorder;

FIG. 16 illustrates the arrangement of FIGS. 2 through 15;

FIG. 17 is a series of pulse time curves illustrating the scanning sequence of the line concentrator system;

FIG. 18 is a table illustrating the connections between lines and trunks and trunk preference for each line;

*General description*

Figure 1:
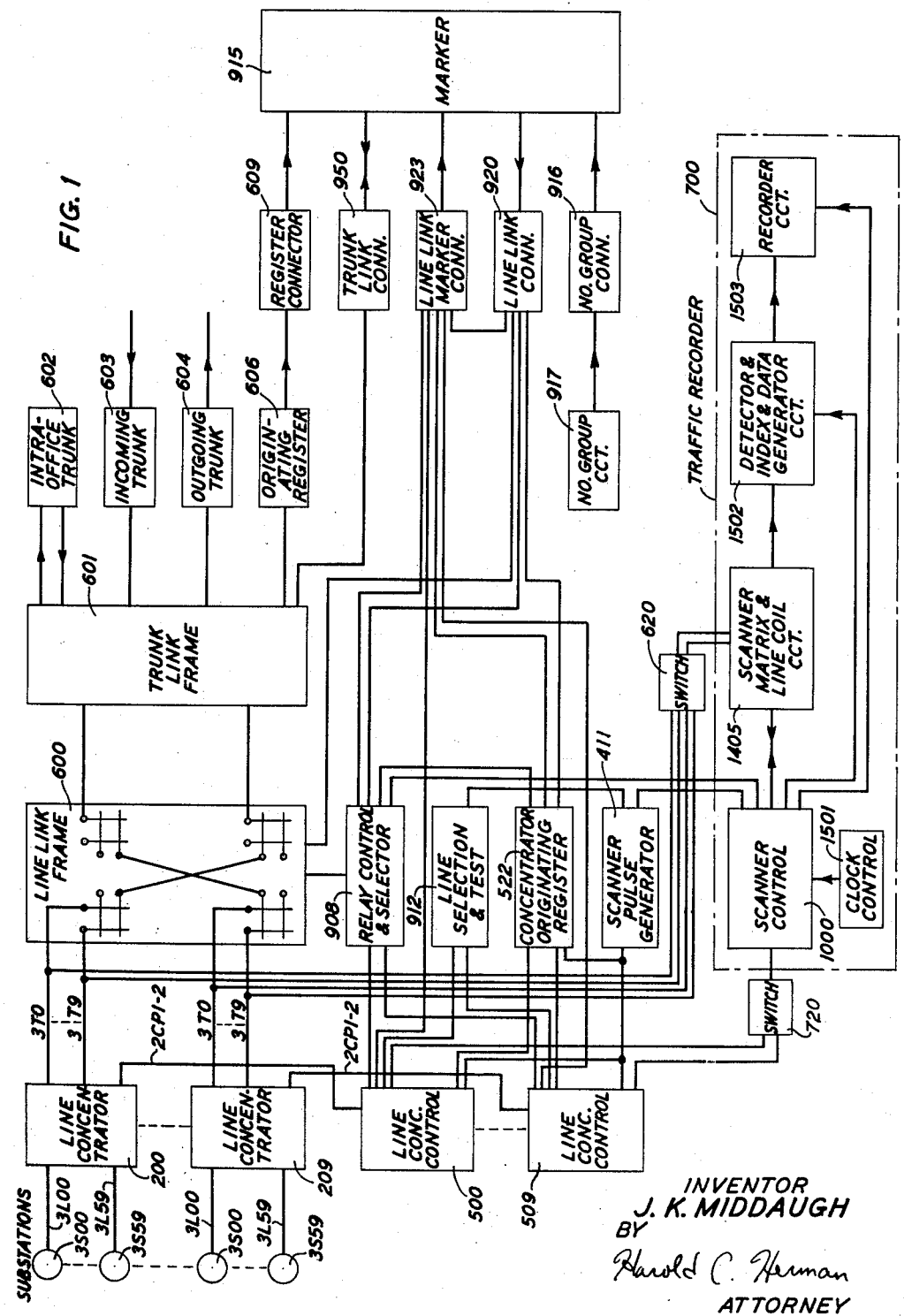

Referring to FIG. 1, the traffic recorder 700 is utilized to sample and record the traffic conditions of a line concentrator telephone system. The line concentrator equipment, shown functionally in FIG. 1, is described in the above-mentioned patent to Joel-Krom-Posin. The line concentrator system is shown functionally in FIG. 1 and in some detail in FIGS. 2 through 15, arranged in accordance with FIG. 16, because its scanning system is utilized by the traffic recorder 700 to sample traffic conditions. Functionally, the line concentrator scanning system becomes part of the traffic recorder when the traffic conditions are being sampled.

Before proceeding with a description of the operation of the traffic recorder 700, the operation of the line concentrator system is briefly described with emphasis upon the scanning system. A similar scanning system is described in detail in Patent 2,853,553 to Almquist-Joel-Posin, granted September 23, 1958.

The first digit or digits of each of the reference numbers of the components shown in FIG. 1, and in FIGS. 2–15 as well, indicates the figure of the detailed circuit drawing in which the component appears. For example, the subscriber station 3S04 appears in FIG. 3 of the detailed drawings.

The line concentrator system is utilized to concentrate the traffic from ten sets of 60 subscriber stations 3S00–59, through ten line concentrators 200–9. The ten sets of stations 3S00–59 and the line concentrators 200–9 are remotely located. All the rest of the equipment shown in FIG. 1 is located at the central office. The remotely located line concentrators 200–9 are the first switching stages to which the stations 3S00–59 are connected.

The line concentrators 200–9 are connected respectively to a central office line link frame 600 by ten sets of ten trunks 3T0–9 and to ten individually associated line concentrator control circuits 500–9 by means of ten sets of two control pairs 2CP1–2. Each of the concentrators 200–9 is connected to the frame 600 by one of the sets of trunks 3T0–9 and to an associated one of the circuits 500–9 by one of the sets of control pairs 2CP1–2. The line link frame 600 is connected through a trunk link frame 601 to at least one intraoffice trunk 602, one incoming trunk 603 and one outgoing trunk 604.

Through the line concentrators 200–9, the line link frame 600 and the trunk link frame 601, traffic flows in two directions: originating calls from one of the substations 3S00–59 and terminating calls from the trunks 602 and 603. The line concentrators 200–9 are therefore bilateral, handling both originating and terminating calls. The effect of utilizing the bilateral line concentrators 200–9 is to place a part of the central office switching equipment at a remote location.

Under control of a scanner pulse generator 411, which is located in the central office, each of the line concentrators 200–9 cyclically scans the 60 subscriber lines 3L00–59 connected thereto. The scanning operation determines the service condition of each line and supplies it to the central office. More specifically, the scanner pulse generator 411 simultaneously provides scanning pulses through the ten line concentrator control circuits 500–9 and the ten sets of control pairs 2CP1–2 to the ten line concentrators 200–9. The line concentrator control circuits 500–9 are individually associated with the concentrators 200–9 and all the rest of the central office equipment, including the generator 411, is common control equipment.

The generator 411 also supplies the scanning pulses to a concentrator originating call register 522. The ten line concentrators 200–9 and the register 522 are, in this manner, synchronously and cyclically operated under control of the scanning pulses from the generator 411.

The scanner pulse generator 411 supplies five types of pulses: vertical group pulses, vertical file pulses, reset pulses, readying pulses and timing pulses. These pulses are illustrated in the scanning pulse sequence diagram shown in FIG. 17. As in ordinary crossbar telephone systems the subscriber lines are arranged in groups designated vertical groups, vertical files and horizontal groups. Such crossbar systems are described, for example, in the Patent 2,585,904 which was granted to A. J. Busch on February 19, 1952. All the subscriber lines connected to one of the ten concentrators 200–9 are in the same horizontal group and they are subdivided into twelve vertical groups, each of which includes five vertical files. Each of the vertical group pulses supplied by the scanner pulse generator 411 selects a group of five lines connected to each of the ten line concentrators 200–9. The vertical group pulse is supplied simultaneously to the ten line concentrators 200–9 so that five times ten or fifty subscriber lines are selected. Between two such vertical group pulses, the scanner pulse generator 411 supplies five vertical file pulses to the concentrators 200–9 to select one subscriber line connected to each of the concentrators or ten in all. In order to scan the 600 lines, the generator 411 provides to each of the ten concentrators 200–9 and to the register 522, twelve 15-volt vertical group pulses spaced at intervals of 10 milliseconds and five 15-volt vertical file pulses spaced at intervals of 2 milliseconds between each pair of vertical group pulses. The vertical file and vertical group pulses are ½ millisecond pulses and the complete scanning cycle has a duration of 120 milliseconds.

In addition to the vertical group and the vertical file pulses, the generator 411 supplies one reset pulse at the beginning of the cycle to insure the synchronous operation of the line concentrator scanning cycles and the originating call register cycle with that of the generator 411. The reset pulse also functions as the first vertical file pulse so that only 59 vertical file pulses are provided, instead of 60, during one scanning cycle. The reset pulse is also supplied to a scanner control circuit 1000 in the traffic recorder 700 which, as is hereinafter described, periodically records the service condition of the lines and trunks under control of the scanner pulse generator 411. In addition to the reset pulse, the generator 411 also supplies 60 timing pulses and one readying pulse during each scanning cycle to the scanner control circuit 1000. The timing pulses, which are also supplied to the circuits 500–9 and to a line selection and test circuit 912, function as synchronizing or clock pulses, and the readying pulse, which precedes the reset pulse by 40 milliseconds, functions to condition the circuit 1000 for a sampling sequence of operation. The timing pulses to the circuits 500–9 and 912 are utilized when a call to or from one of the 600 subscriber lines is being served.

During the normal scanning cycle, the pulse generator 411 continuously and cyclically supplies the reset pulse, vertical group pulses and vertical file pulses to the register 522 and the concentrators 200–9. One vertical file pulse is provided for each of the 60 subscriber lines terminating at a concentrator if the reset pulse is counted as a vertical file pulse. The vertical group pulses ready the concentrators 200–9 for scanning the five times ten, or fifty lines, in the vertical group, and each vertical file pulse scans one line connected to each of the concentrators 200–9 in the readied group. The scanning is in parallel so that effectively a separate vertical group pulse is simultaneously supplied to each of the ten line concentrators 200–9. The generator 411 is not stopped during the operating sequence of the line concentrator system but continuously and cyclically generates the scanning pulses.

If a line is idle, the vertical file pulse associated therewith is blocked. When a call is initiated at one of the subscriber lines 3L00–59, however, the associated vertical file pulse is routed back to the central office as a service request pulse. The service request pulse initiates an originating call sequence of operations unless a traffic sampling sequence of operations is in progress.

The recorder 700 functions to sample and record the concentrator line and trunk usage, the call destination, dial-tone speed and the reason for terminating the request for dial tone. The recorder 700 scans each of the subscriber lines and trunks, connected to a selected one of the ten line concentrators 200–9, every 15 seconds during a number of daily recording sessions. The concentrator is selected by the switches 620 and 720. With the switches 620 and 720 set to select the line concentrator 200, the traffic recorder 700 is ready for scanning the 60 lines 3L00–59 and the ten trunks 3T0–9 connected to the concentrator 200. During the scanning interval a recording is made of the traffic condition of each of the lines 3L00–59 and the traffic condition of each of the ten trunks 3T0–9 which are connected to the line concentrator 200 by a recorder circuit 1503.

At the beginning of each recording session a clock control 1501 applies a reset pulse to the scan control circuit 1000 to insure that the scan control circuit 1000 is normal or ready for a sampling sequence of operation. Thereafter the clock control 1501 provides a control or concentrator scan potential every 15 seconds to the scan control circuit 1000 in order to initiate a line and trunk scan. The clock control 1501 also provides to the scan control circuit 1000 an indication of which recording session is being initiated. When the scan control circuit 1000 is readied in this manner by the clock control 1501, it provides a concentrator hold potential to the concentrator control circuits 500–9. The concentrator hold potential inhibits the reception of service requests at the circuits 500–9. The originating call sequence of operations and the traffic sampling sequence of operations are in a mutual lockout circuit arrangement. The concentrator control circuits 500–9 do not recognize originating requests for service as long as the hold potential is supplied thereto from the scan control circuit 1000. A terminating call, however, to any of the concentrators 200–9 will override the hold signal and allow the associated one of the control circuits 500–9 to handle the terminating call in a normal fashion.

With the scan control circuit 1000 readied by the control potential from the clock control 1501, the next readying or ARS pulse from the scanner pulse generator 411 is accepted in the scan control circuit 1000. A readying pulse is supplied from the scanner pulse generator 411 every 120 milliseconds or once during each scanning cycle as shown in FIG. 17. The readying pulse which precedes the reset pulse by 40 milliseconds is utilized to condition the circuit 1000 for the reception of the reset pulse. When the circuit 1000 receives the readying pulse, it initiates the operation of the recorder circuit 1503, it supplies an indication of which recording session is in progress to the circuit 1502, and it readies itself for receiving the next reset pulse from the generator 411. The timing pulses from the generator 411 are utilized to supply the recording session identity.

When the next reset pulse is received at the scan control circuit 1000, the actual sampling sequence commences. The next timing pulse received from the generator 411 after the reset pulse is associated with the subscriber line 3L00 connected to the concentrator 200. Since the normal scanning sequence of operations is uninterrupted at this time, service request and line busy pulses from the lines 3L00–59 are returned to the concentrator control circuit 500. The service request pulses are blocked in circuit 500 but the line busy pulses are supplied from the concentrator control circuit 500 to the scan control circuit 1000. If line 3L00 is busy at this time, a line busy pulse will be received at the scan control circuit 1000 during the same time slot that the timing pulse associated therewith is received from the pulse generator 411. The scan control circuit 1000, therefore, can readily determine whether a particular line is idle or busy. If the line 3L00 is idle the scan control circuit 1000 provides an indication thereof to the detector and index generator circuit 1502, and similarly if the line is busy the circuit 1000 provides an indication thereof to the circuit 1502. When the circuit 1502 receives the idle or busy indication it controls the recorder circuit 1503 to record a coded indication thereof on three tracks of a magnetic tape. The coded indications are hereinafter described in the detailed circuit description. Briefly, if the line is idle a positive mark is provided only on track 1, and if the line is busy a positive mark is provided on tracks 1 and 2. The mark on track 1 serves to identify the sampled line. The sampling sequence continues, in this manner, with the traffic condition of the lines 3L00–59 being sampled by the scan control circuit 1000 and recorded by the circuit 1503. The entire sampling sequence for the 60 subscriber lines takes 120 milliseconds which is the duration of the scanning cycle of the generator 411.

When the second reset pulse from the scanner pulse generator 411 is provided to the scan control circuit 1000, it functions to disable the scan control circuit 1000 so that the sampling of traffic conditions of lines 3L00–59 is halted. Subsequent line busy pulses from the control circuit 500 are not recognized. Moreover, terminating calls which occur after the second reset pulse is received at the scan control circuit 1000 will not interfere with completion of the trunk sampling sequence which immediately follows the line sampling sequence. When the scan control circuit 1000 receives the second reset pulse, it supplies the clock or timing pulses to the scanner matrix and line coil circuit 1405 to initiate the trunk sampling sequence. The first clock pulse provided to the circuit 1405 is associated with the trunk 3T0; the second clock pulse is associated with the trunk 3T1, etc. The scan control circuit 1000 also supplies the clock, or reference pulses, to the circuit 1502.

The circuit 1405 is driven by the clock pulses from circuit 1000 to determine the idle or busy condition of each of the trunks 3T0–9 connected to the line concentrator 200 and also to determine if it is busy for an intraconcentrator call. If a trunk is busy, the circuit 1405 supplies a busy indication to circuit 1502 during the same time slot as the associated clock pulse from the circuit 1000.

Whenever any one of the trunks 3T0–9 becomes busy, the circuit 1405 responds to the change of electrical conditions on the trunk and supplies a superaudible tone thereto. The application of the superaudible tone to the trunks 3T0–9 is continuous even before the trunk sampling sequence is initiated. The superaudible tone does not interfere with ordinary telephone service because it cannot be heard by the telephone subscribers. When the clock pulses are received by the circuit 1405, they successively block the application of the superaudible signal if present to the ten trunks 3T0–9, and, as described above, the circuit 1405 supplies an indication to the circuit 1502 as to whether the particular trunk being sampled is idle or busy.

When a busy trunk is being scanned, the superaudible tone is blocked thereto. If, however, the sampled or scanned trunk is busy for an intraconcentrator call, the superaudible tone remains on the talking connection because it is only removed from one of the two interconnected trunks. The continuation of the superaudible tone during the sampling interval of the particular trunk indicates that the call is an intraconcentrator call from one of the lines 3L00–59 to another one of the lines 3L00–59, both connected to concentrator 200. The circuit 1405 supplies the superaudible tone to the circuit 1502 as an indication that the scanned trunk is busy for an intraconcentrator call. The circuit 1502 receives the busy information and controls the recorder circuit 1503 in accordance therewith. For example, if the call is an intraconcentrator call, a positive mark is applied to all three tracks of the magnetic tape.

Other superaudible tones can be applied directly to the trunks 602–4, to other control circuits not shown etc. to provide for the recording of other busy conditions. The utilization of superaudible tones in this manner is described in Patent 2,976,365, granted March 21, 1961 to W. R. Young, Jr.

When the trunk sampling sequence is completed, an indication thereof is provided from the circuit 1405 to the scan control circuit 1000 which returns or releases to its normal condition. When the scan control circuit 1000 releases, it stops the recorder circuit 1503, blocks the timing pulses to circuit 1405 and removes the hold potential from the circuits 500–9. The traffic recorder 700 in this manner completes the scanning cycle and restores itself to normal ready to accept the next clock signal from the clock control 1501 or to perform one of its other functions.

With the hold potential removed, originating calls from any one of the lines 3L00–59 connected to concentrators 200–9 may be served. For example, if the call originates at the line 3L04 connected to concentrator 200, the vertical file pulse 04 is transformed at the concentrator 200 to a service request pulse and supplied back over the control pairs 2CP1–2 to the central office. The service request pulse is received by the control or detector circuit 500, which thereupon functions generally to register the concentrator or horizontal group identity, to block the transmission of the scanning pulses to all ten concentrators 200–9, to supply an indication that a service request has been received to the scanner control 1000 and to stop the register 522. The register 522, which was cyclically keeping count of the vertical file and vertical group pulses, is locked at the identity of the calling line 3L04.

As described above, the circuits 500–9 are inhibited from recognizing service requests if a traffic sampling sequence of operations has been initiated by the clock control 1501 in the traffic recorder 700. Before the actual sampling is commenced, the circuit 1000 supplies a control or disabling potential to the circuits 500–9 to inhibit the recognition of service requests. Once a sampling sequence has commenced therefor, service requests are not recognized at the circuits 500–9.

Assuming that the service request pulse is received between sampling intervals, the circuit 500 completes its above-designated functions. The service request indication to circuit 1000 is continuous until the request for dial tone is terminated. The service request indication to the circuit 1000 inhibits it from commencing the actual sampling of traffic conditions if a control potential is received from the clock control 1501 before the request is terminated during the delay for dial tone. The service request indication at circuit 1000 also initiates a dial-tone delay speed measurement sequence of operation which is hereinafter described.

When the circuit 500 registers the horizontal group identity, an indication of the horizontal group identity is supplied to a line link marker connector 923. As described above, the circuit 500 is individually associated with the concentrator 200 so that the horizontal group 0 is indicated. The connector 923 is associated with a marker 915 which controls the establishment of a talking connection through the line link frame 600 and the trunk link frame 601. The marker 915 is seized by the connector 923 after the vertical group identity has been supplied thereto from the register 522.

When the register 522 is stopped on the line location, it supplies the vertical group identity to the connector 923 and it also readies a path for supplying the vertical file identity through the relay control and selector circuit 908 to the line link connector 920. The circuit 908 is associated with and controls the operation of the line link frame 600. When the connector 923 receives the vertical group identity, it seizes the marker 915 and supplies the horizontal and vertical group information thereto. When the marker 915 is seized, it in turn seizes the line link frame 600 by means of the line link connector 920 and circuit 908. When the marker 915 seizes the line link frame 600, the circuit 908 completes the path for supplying the vertical file information to the marker 915. The marker 915 thereupon has the horizontal group, vertical group and vertical file information which identifies, respectively, the concentrator 200 and the line 3L04 connected thereto.

When the marker 915 seizes the connector 920, it supplies to the circuit 908 the identity of the calling line 3L04 and an indication that a dial tone or originating call is being served. When the circuit 908 receives the calling line identity and the originating call indication, it initates two concurrent sequences of operation: (1) it initiates a sequence for selecting one of the trunks 3T0–9 for connection to line 3L04; and (2) it initiates an outpulsing operation at circuit 912 for supplying the calling line identity to the concentrator 200. The trunk selecting sequence of operation is described in the above identified disclosure by Joel-Krom-Posin and also in Patent 2,853,-554, granted September 23, 1958, to Brooks-Joel-Krom.

Concurrent with the trunk selecting sequence of operation by the circuit 908, the marker 915 selects an idle connection partially through the line link frame 600 and through the trunk link frame 601 to the originating register 606. The register 606 is seized by the marker 915 through the connector 609, and the frame 601 is seized by the marker 915 through the connector 950. When the connection is established from the frame 600 to the register 606, an indication thereof is provided from the frame 600 to the circuit 908. With the trunk selecting sequence of operation completed, and the connection to register 606 established, the circuit 908 readies a path for supplying a plus 100-volt connect potential through the frame 600 and the tip lead of the selected trunk to the concentrator 200.

The connect potential is supplied to the concentrator 200 when both the trunk selecting and the outpulsing sequences of operation are completed. The outpulsing sequence of operation, as described above, is concurrent with the trunk selection sequence of operations. When the circuit 908 receives the concentrator and line identity from the marker 915, it supplies the calling line identity to the line selection and test circuit 912.

Under control of the calling line information from the circuit 908 and the timing pulses from the generator 411, the circuit 912 supplies the identity of the calling line 3L04 through the circuit 500 and control pairs 2CP1–2 to set the concentrator 200 at the calling line identity.

The circuit 912 thereafter supplies a series of mark pulses through circuit 500 and the control pairs 2CP1–2 to the concentrator 200, and operates circuit 908 to supply the connect potential to the tip lead of the selected trunk. If the selected trunk is trunk 3T6, the connect potential is supplied over its tip lead to concentrator 200. The combination of the mark pulses, with the concentrator 200 set at the calling line identity by the vertical group and vertical file identifying pulses, and the connect potential over the tip lead of the selected trunk 3T6 causes the concentrator 200 to establish a talking connection from line 3L04 to trunk 3T6 and to provide an indication thereof over the control pair 2CP2 to the central office. In the central office, the indication is provided through circuit 500 to circuit 912.

When the circuit 912 receives the indication, it provides a connection establishment indication to the circuit 908. When the circuit 908 receives this indication, it removes the connect potential from the tip lead of the trunk 3T6. The talking connection from line 3L04 to trunk 3T6 is locked in so that it is not disturbed by the removal of the connect potential. When circuit 908 receives the closure indication, it also operates the line link frame 600 to connect the trunk 3T6 to the already established connection, described above, from frame 600 to the register 606. The originating call connection from line 3L04 to the originating register 606 is, in this manner, established. When the frame 600 is operated to complete the connection, an indication thereof is supplied to the marker 915 which releases the connector 920. When the connector 920 is released, it, in turn, releases the circuit 908 and the circuit 908, in turn, partially releases circuits 912 and 500 and it provides an indication to the circuit 1000 that dial tone was provided. When circuit 500 is partially released, it provides a reset pulse to circuit 912, to the register 522, and to the concentrator 200 and it returns the pulsing paths to the generator 411. As soon as the pulsing paths are returned, normal scanning is resumed. When circuit 912 is released, it allows circuit 500 to completely release.

As long as the originating connection is established, whenever line 3L04 is scanned, a line busy pulse is returned to the central office. Normal scanning continues during dialing and even during the establishment of a call-back connection.

When dialing is completed, the originating register 606 calls in the marker 915 through the register connector 609. The marker 915 receives the dialing information from the register 606 and utilizes it to establish a connection from the calling line 3L04 through trunk 3T6 to an outgoing trunk 604.

The marker 915 releases after it completes the call-back connection from line 3L04 through trunk 3T6. When the marker 915 releases, it in turn releases the relay control circuit 908 which is utilized in establishing the line-to-trunk connection.

During the establishment of the call-back connection, the tens sets of lines 3L00-59 are normally scanned. For example, each 120 milliseconds, a line busy pulse is provided from line 3L04 which remains connected to trunk 3T6. Should a service request originate while the call-back is in progress, the concentrator control, or detector circuits 500-9 recognize the service request as usual. The line requesting service is identified by the register 522 which calls in the line link marker connector 923. The connector 923, however, locks out the originating call if a terminating or call-back call is in progress. When the marker 915 releases for the call-back call, it is seized by the connector 923 for the originating call.

When the calling and called parties disconnect, the talking connection is released at the frames 600 and 601. When the line link frame 600 opens the talking connection, the circuit 908 supplies a minus 130-volt disconnect pulse over the tip lead of trunk 3T6 to the concentrator 200. If another call is being served, the disconnect pulse is delayed until after the call is served. At the concentrator 200 the disconnect pulse causes the release of the locked-in connection from line 3L04 to trunk 3T6.

Returning now to the operation of the recorder 700 after circuit 500 receives a service request pulse, the circuit 500 initiates a dial-tone speed measurement sequence in the recorder 700. When the circuit 1000 receives the service request pulse, it initiates the operation of the recorder circuit 1503, and it initiates a pulsing operation to the circuit 1502. Every one-tenth of a second a control pulse is provided from the circuit 1000 to the circuit 1502 which thereupon controls the circuit 1503 to apply a positive mark to track 2 of the tape. The positive marks on track 2 are utilized to time the delay in providing dial tone to the calling subscriber.

The request for dial tone can be terminated by supplying dial tone to the calling subscriber, by a subscriber disconnect, by all trunks being busy, or by the arrival of a terminating call. The circuit 908 recognizes the type of service request termination and supplies an indication thereof to circuit 1000. When circuit 1000 receives the termination information, it supplies it to the circuit 1502 and halts the pulsing or timing operation. The circuit 1502 thereafter controls the recorder 1502 to record a coded indication of the type of service request termination. For example, if the request is ended because dial tone is provided, the circuit 1503 records a positive mark in tracks 2 and 3. A table listing the recording code is included in the detailed circuit description.

During the time that the dial-tone delay is being measured, the clock control 1501 may attempt to initiate a line and trunk scan. If the control 1501 attempts to initiate a line and trunk scan during the dial-tone measurement sequence, the initiation of the scan is delayed until the measurement is completed. The circuit 1000, however, inhibits the reception of another service request at the circuits 500-9. In other words, a line and trunk scan can only be delayed for one dial-tone measurement sequence.

The terminating call operation of the line concentrator telephone system of the present invention is substantially the same as for an originating call. When a terminating call is initiated, the marker 915 receives the calling information from a number group circuit 917 through a connector 916. When the marker 915 receives the calling information, it seizes the line link connector 920, and supplies to the circuit 908 the called line identity, the horizontal group or concentrator identity and an indication that the call is a terminating call. When the circuit 908 receives this information, it selects an idle trunk connectable to the called line and initiates the outpulsing sequence of operation, described above, by operating the circuits 500 and 912. The circuit 908 also provides a control potential to circuit 1000 to indicate that a terminating call is in progress. When circuit 500 is operated, the scanning cycle is interrupted and subsequent service requests are not recognized. The sequence of operations for a terminating call from the initiation of the operation of circuit 908 is the same as that for an originating call.

When circuit 500 is operated for the terminating call, it also provides a control potential to the circuit 1000. If the control potential is supplied to circuit 1000 during the time a line and trunk scan is taking place, the scan is interrupted. More specifically, if the terminating call occurs between the ARS pulse which readies the recorder 700 for the scan and the second reset pulse which ends the line scan, the scanning sequence is interrupted. When the scan is interrupted, the circuit 1502 controls the recorder circuit 1503 to record an indication thereof.

When the terminating call is served, the control potentials from circuits 908 and 500 are removed from circuit 1000. The next ARS or readying pulse from the generator 411 initiates the line and trunk scan just as if a clock potential had been provided from the clock control 1501.

*Detail circuit description*

Referring to FIGS. 2 through 15, when arranged in accordance with FIG. 16, the first digit or digits of each reference number indicates the figure in the circuit drawings in which the relay, or component, appears, and the letters indicate the function thereof. Relay 5HG0, for example, is the horizontal group relay 0, and appears in FIG. 5.

Before proceeding with a description of the traffic sampling and recording system of the present invention, the line concentrator normal scanning sequence of operations is briefly described. The scanning system is described in detail in the above identified disclosure by Almquist-Joel-Posin. The scanning system is briefly described herein because it is utilized, as is hereinafter described, by the traffic recorder 700.

*Normal concentrator scanning*

Figure 2:
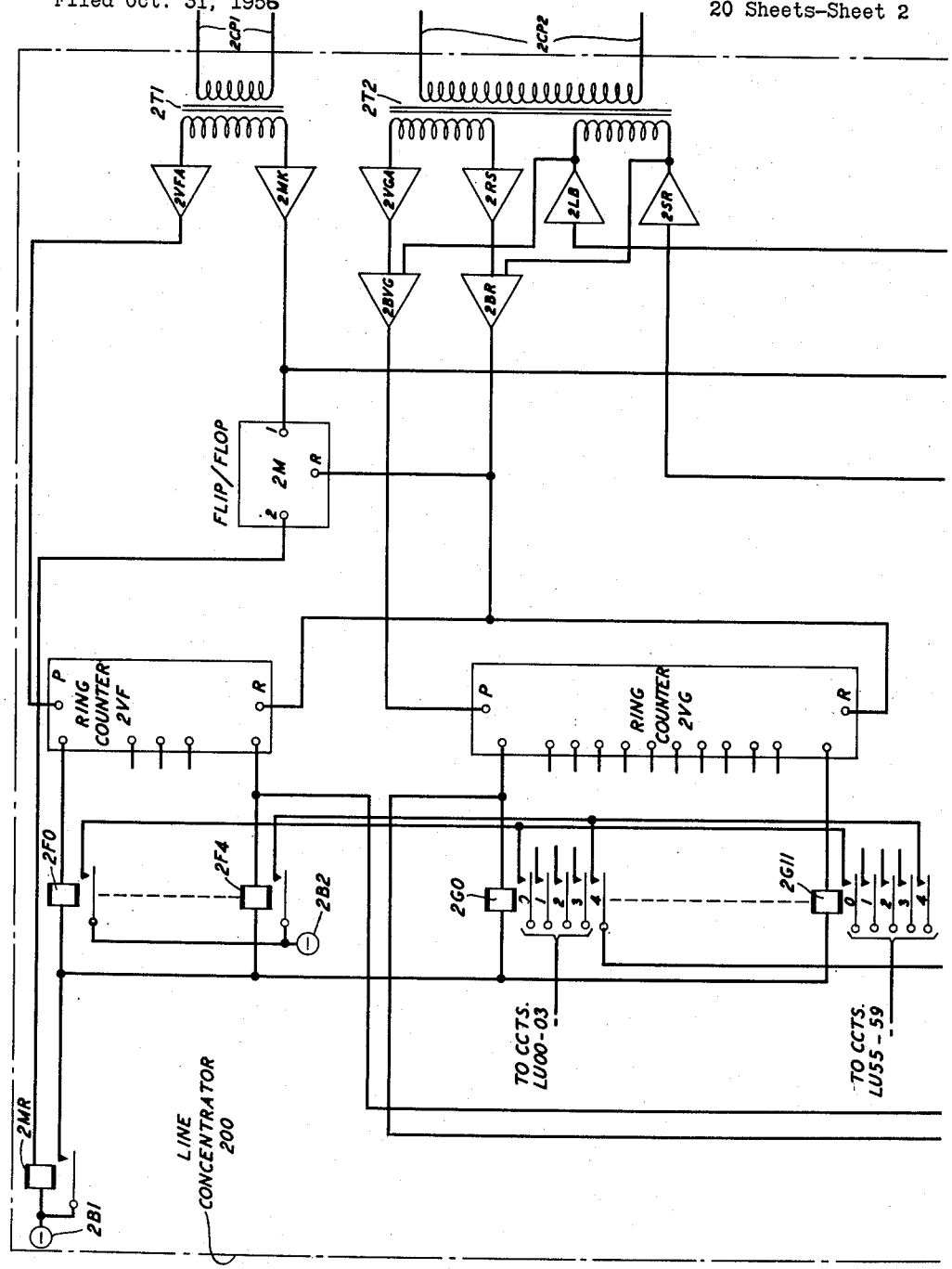
Figure 3:
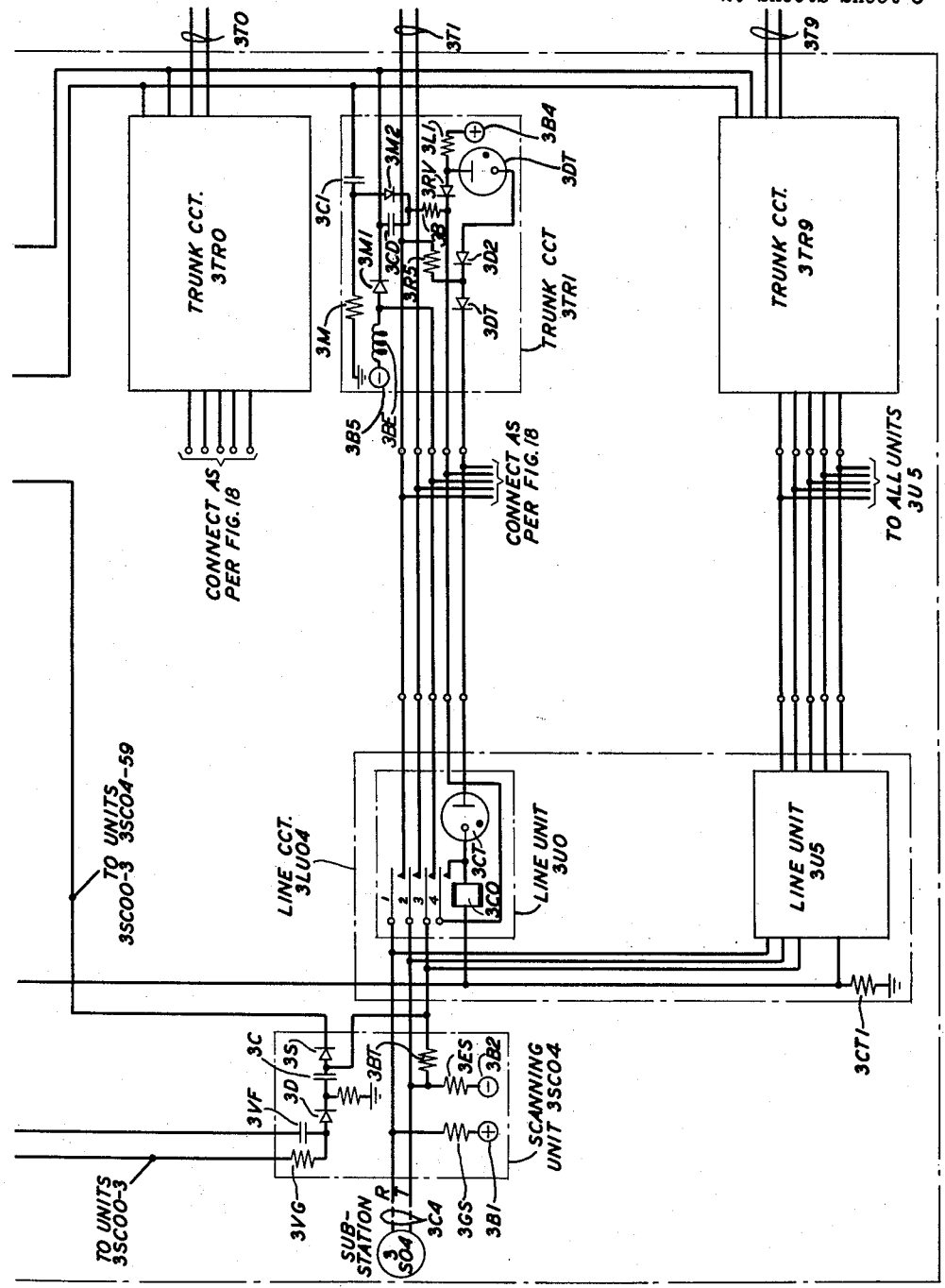
Figure 4:
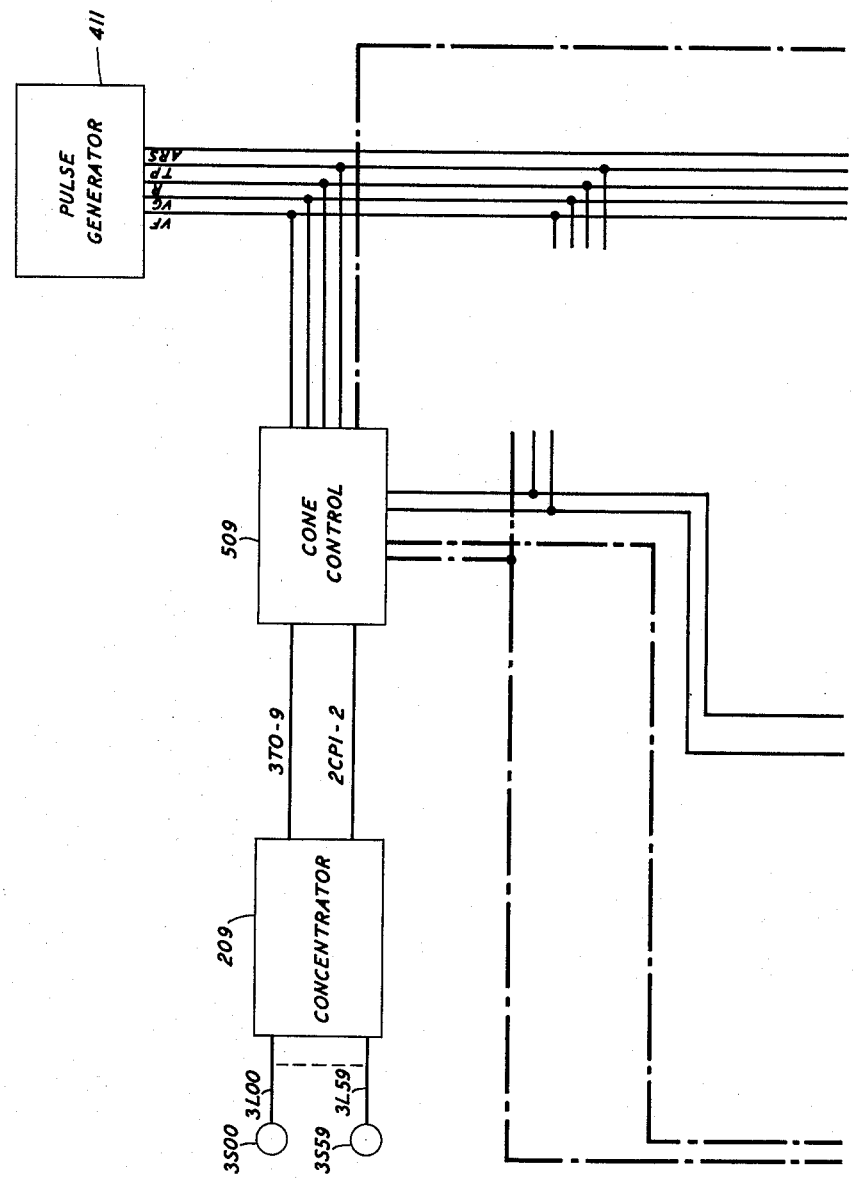
Figure 5:
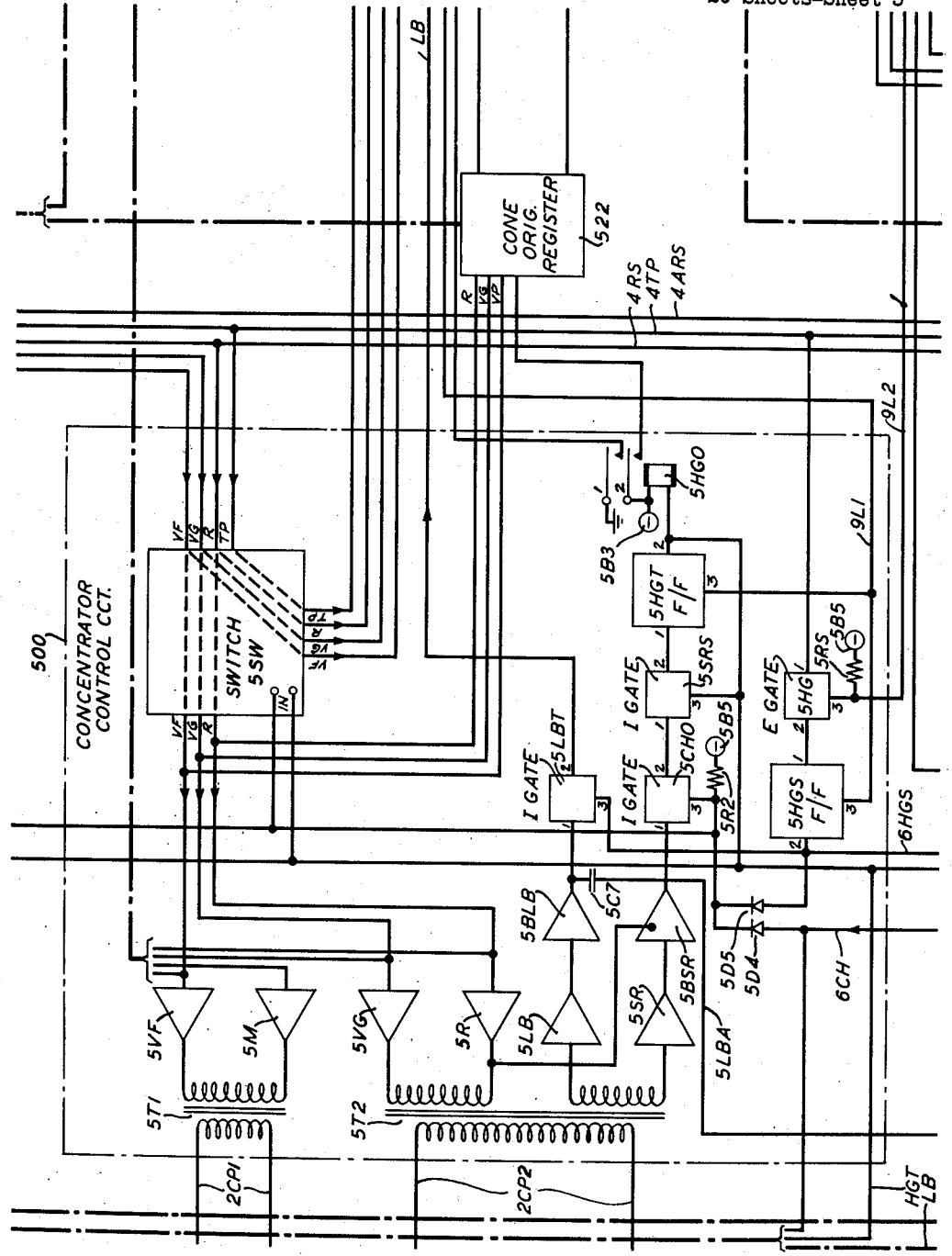
Figure 6:
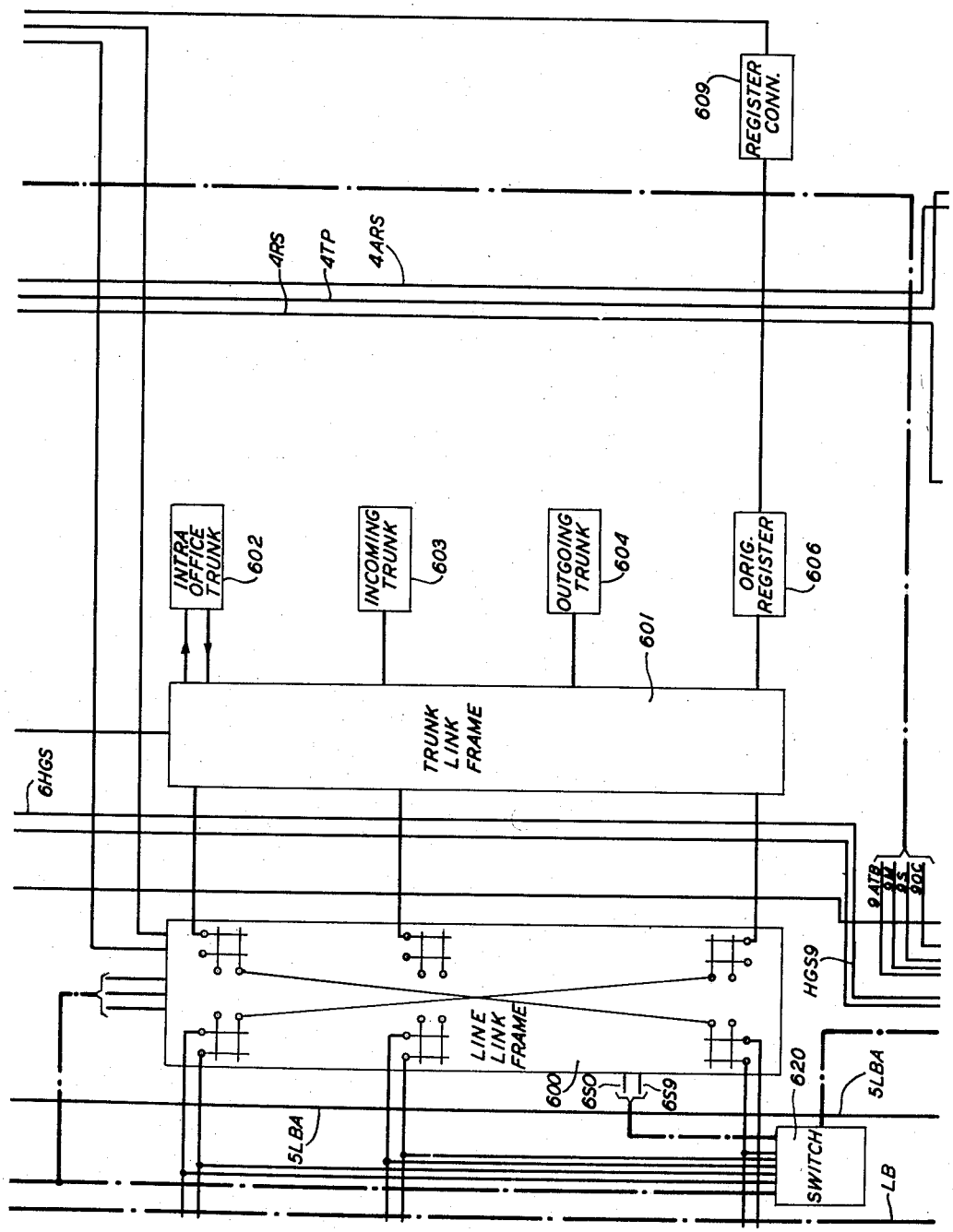
Figure 7:
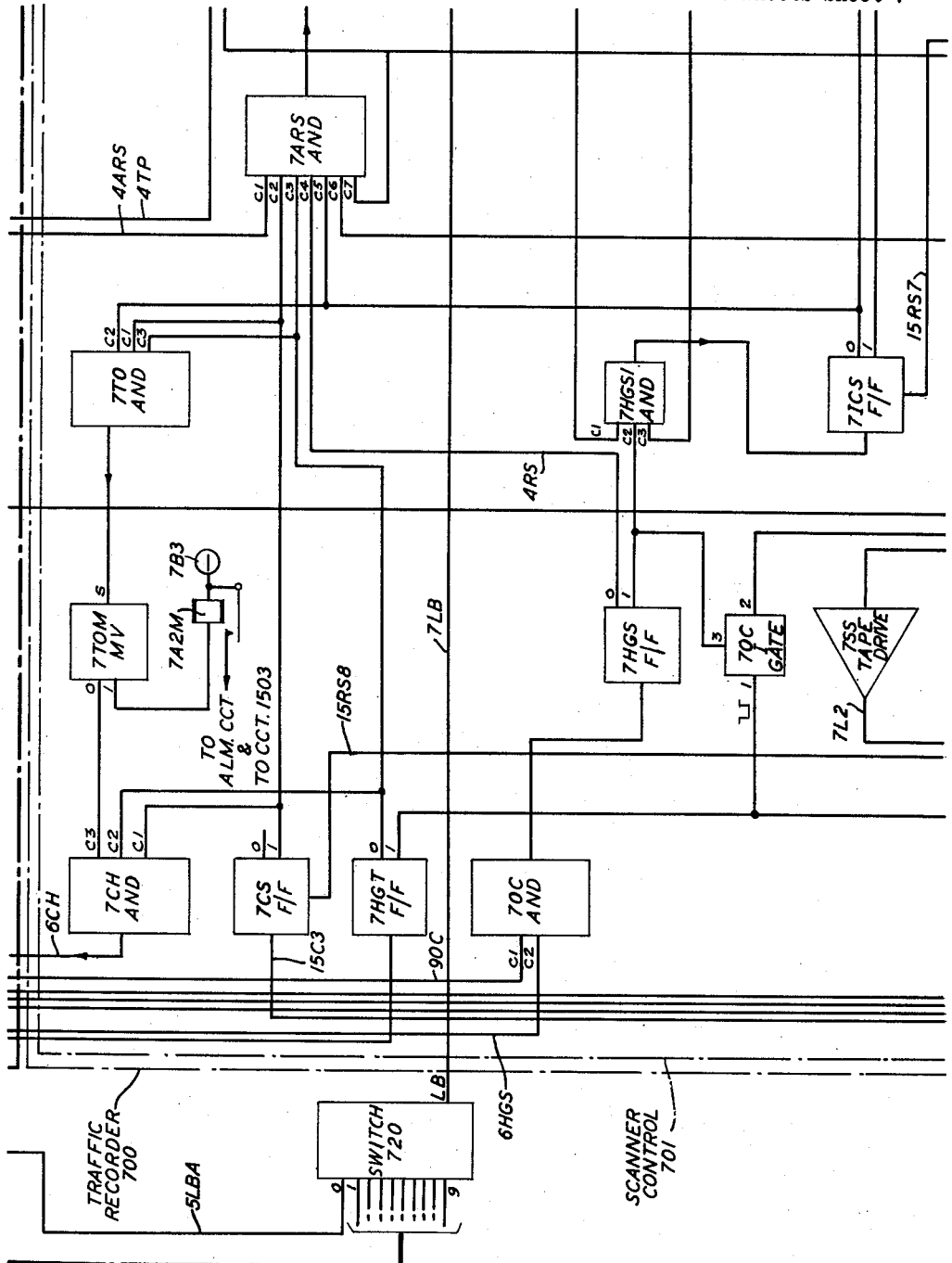
Figure 8:
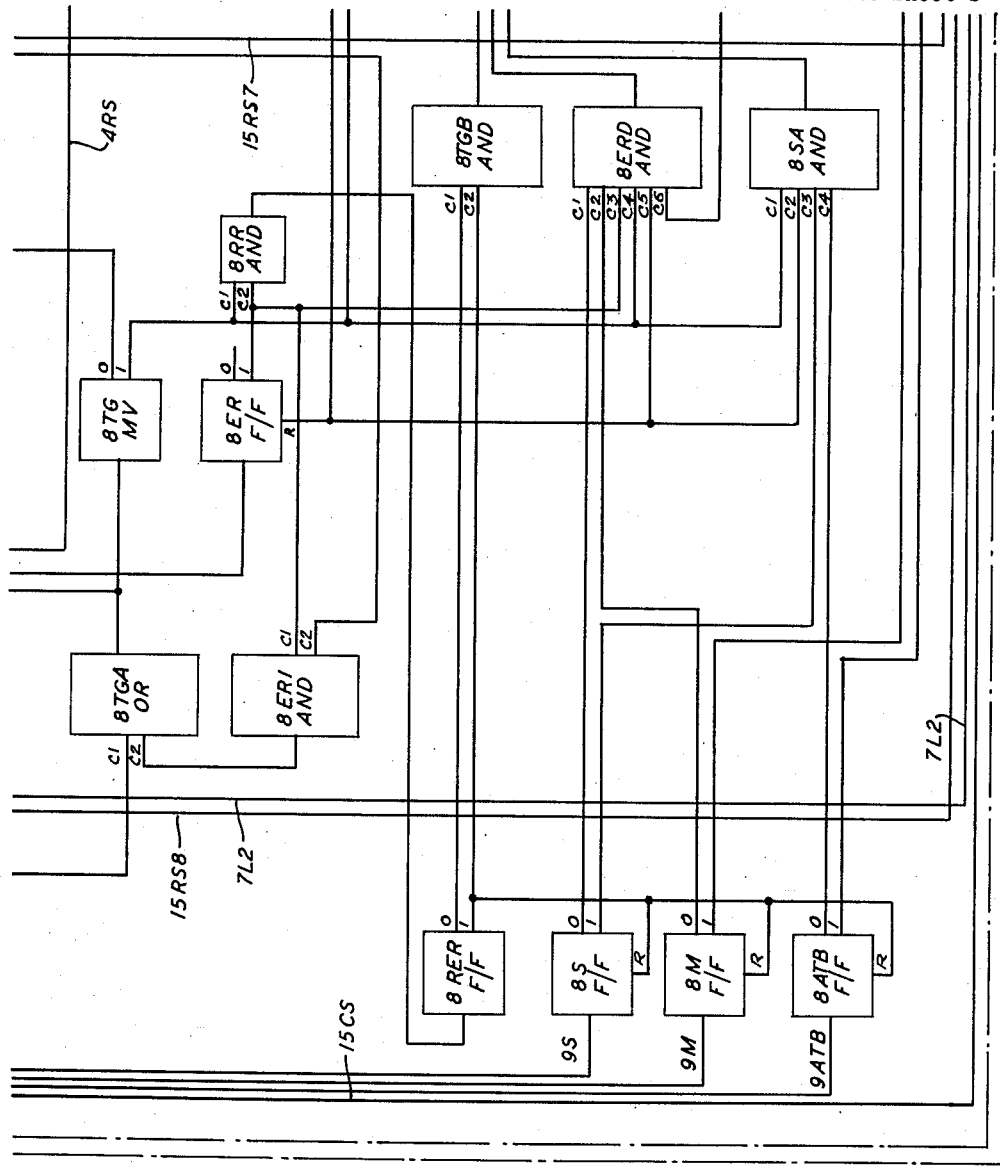
Figure 9:
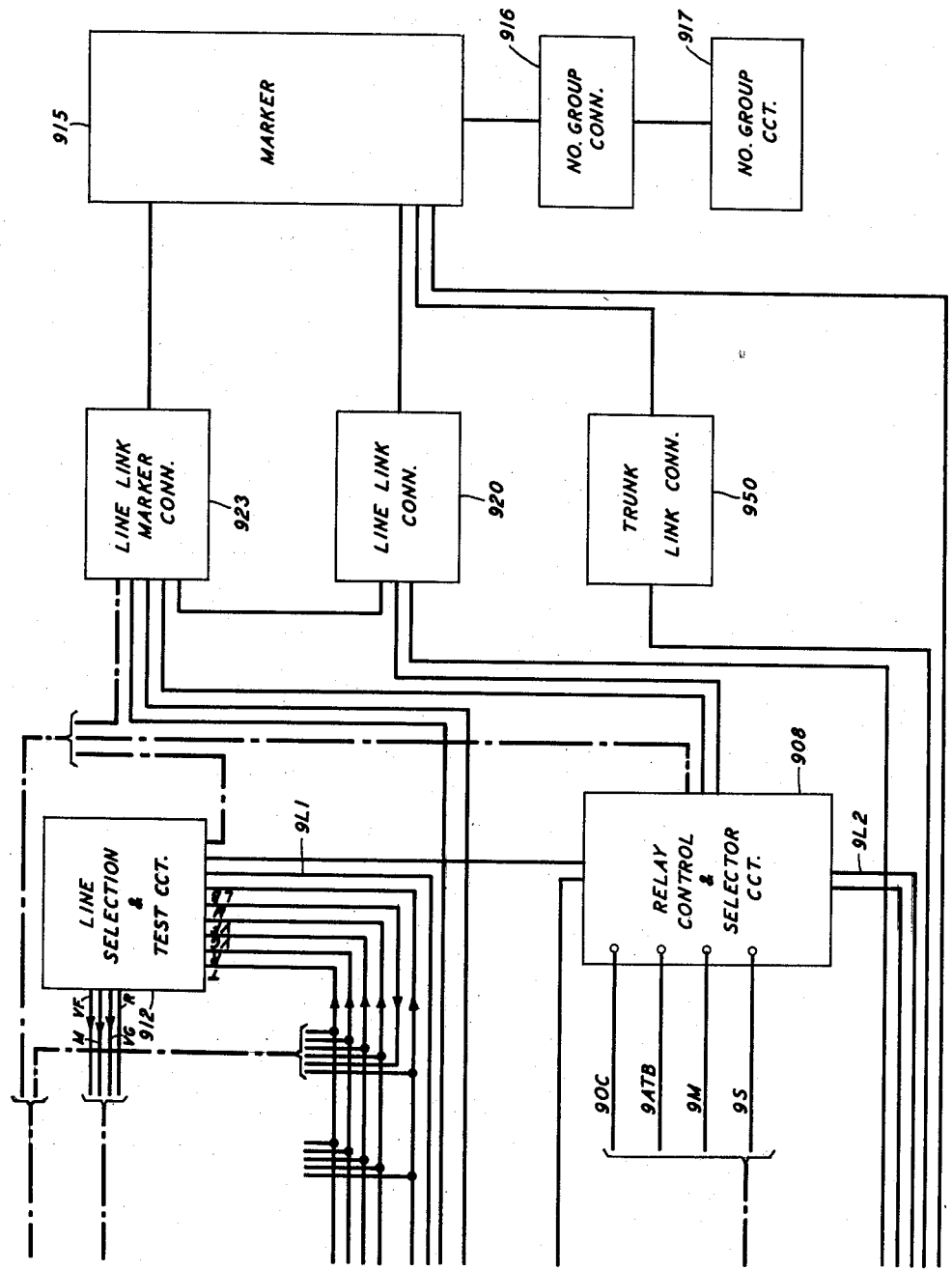
Figure 10:
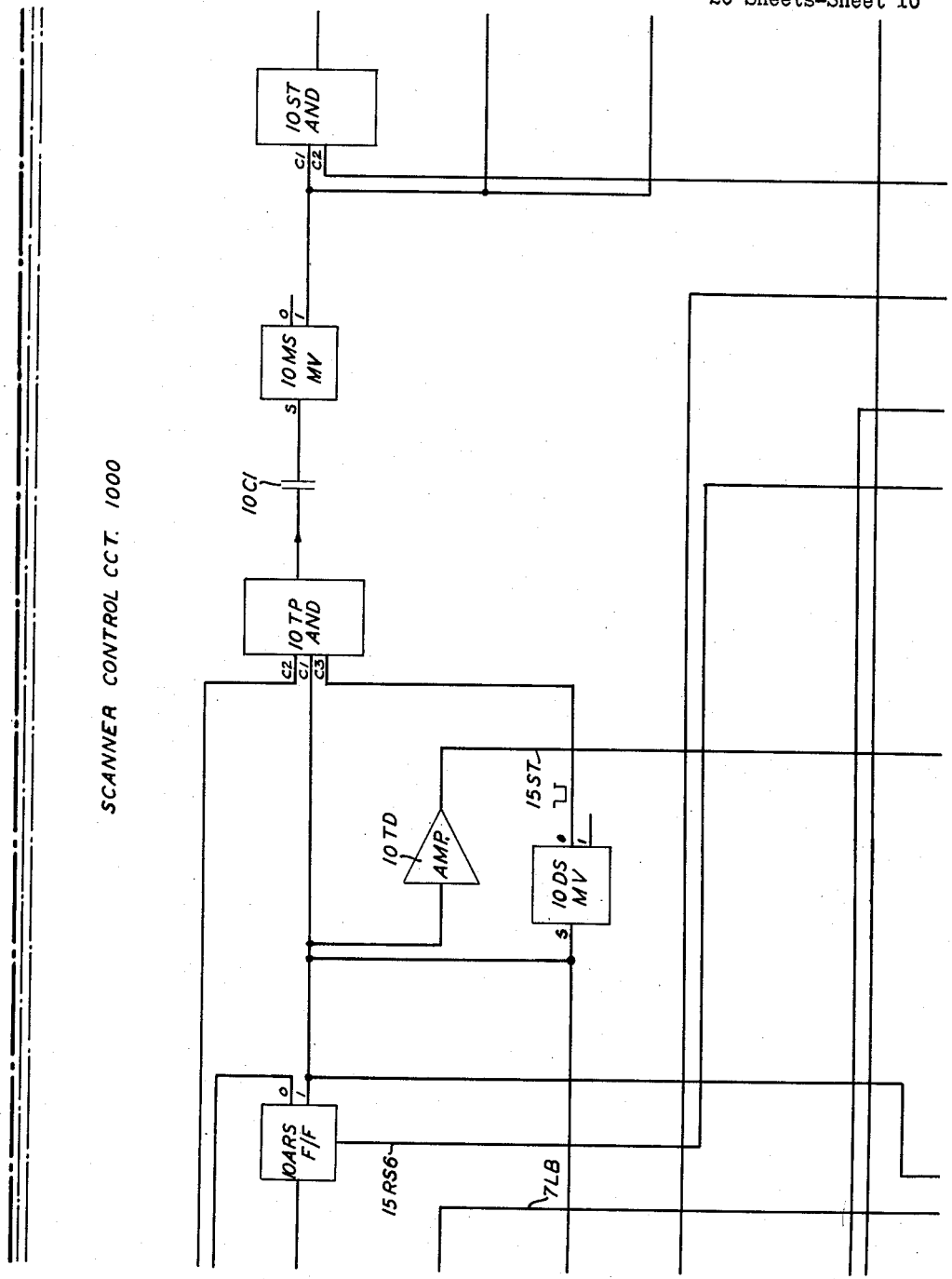
Figure 11:
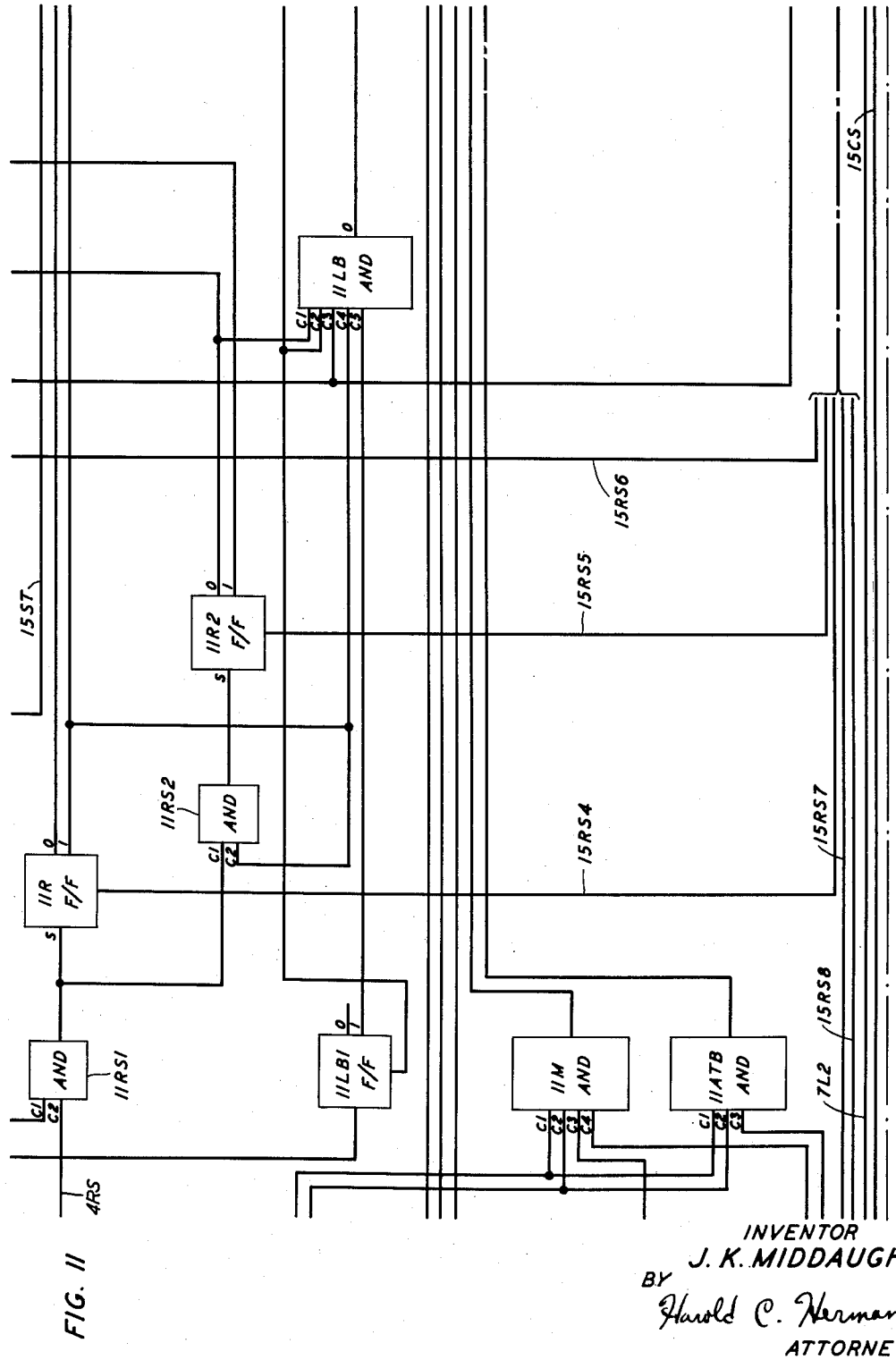
Figure 12:
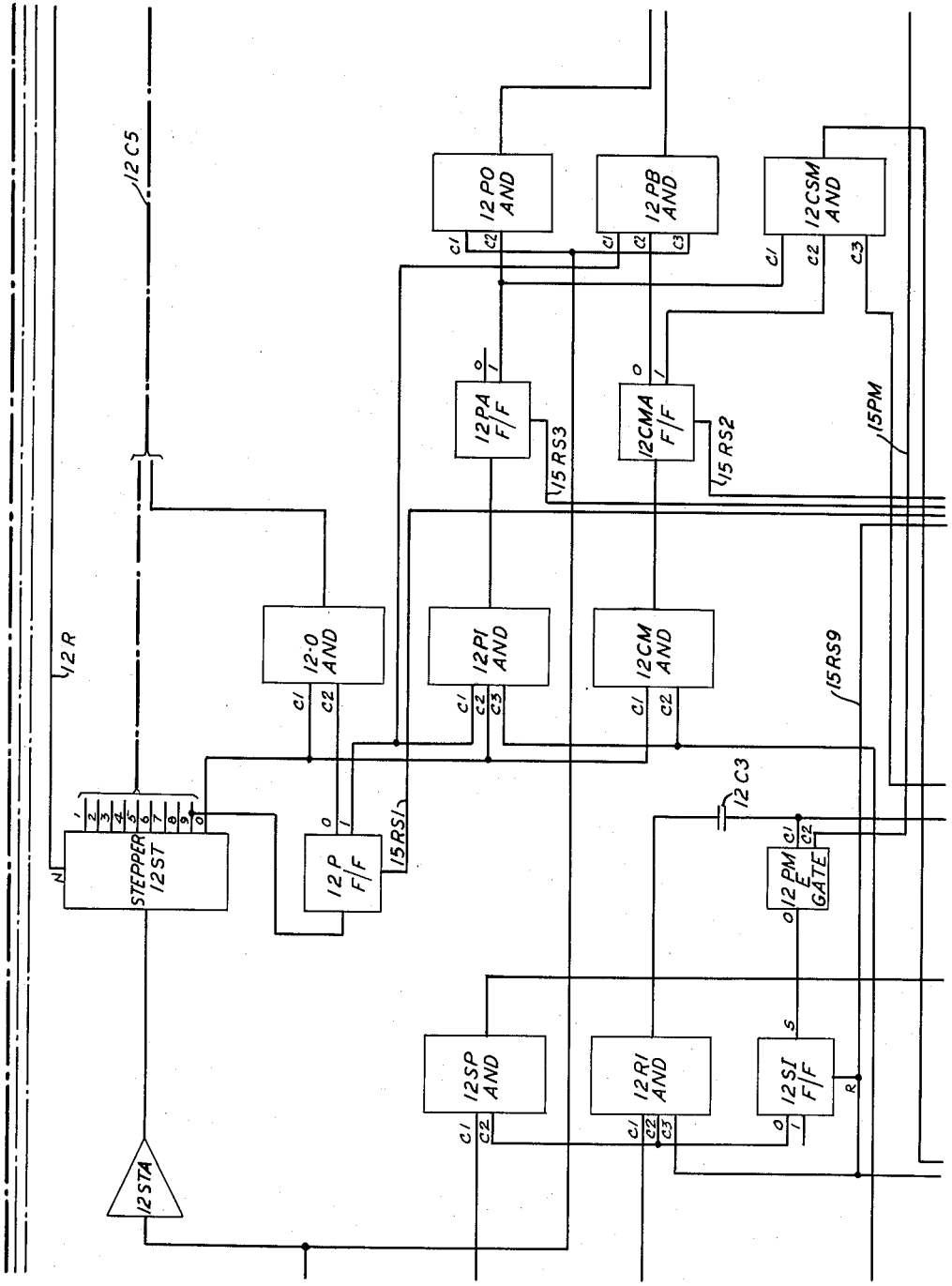
Figure 13:
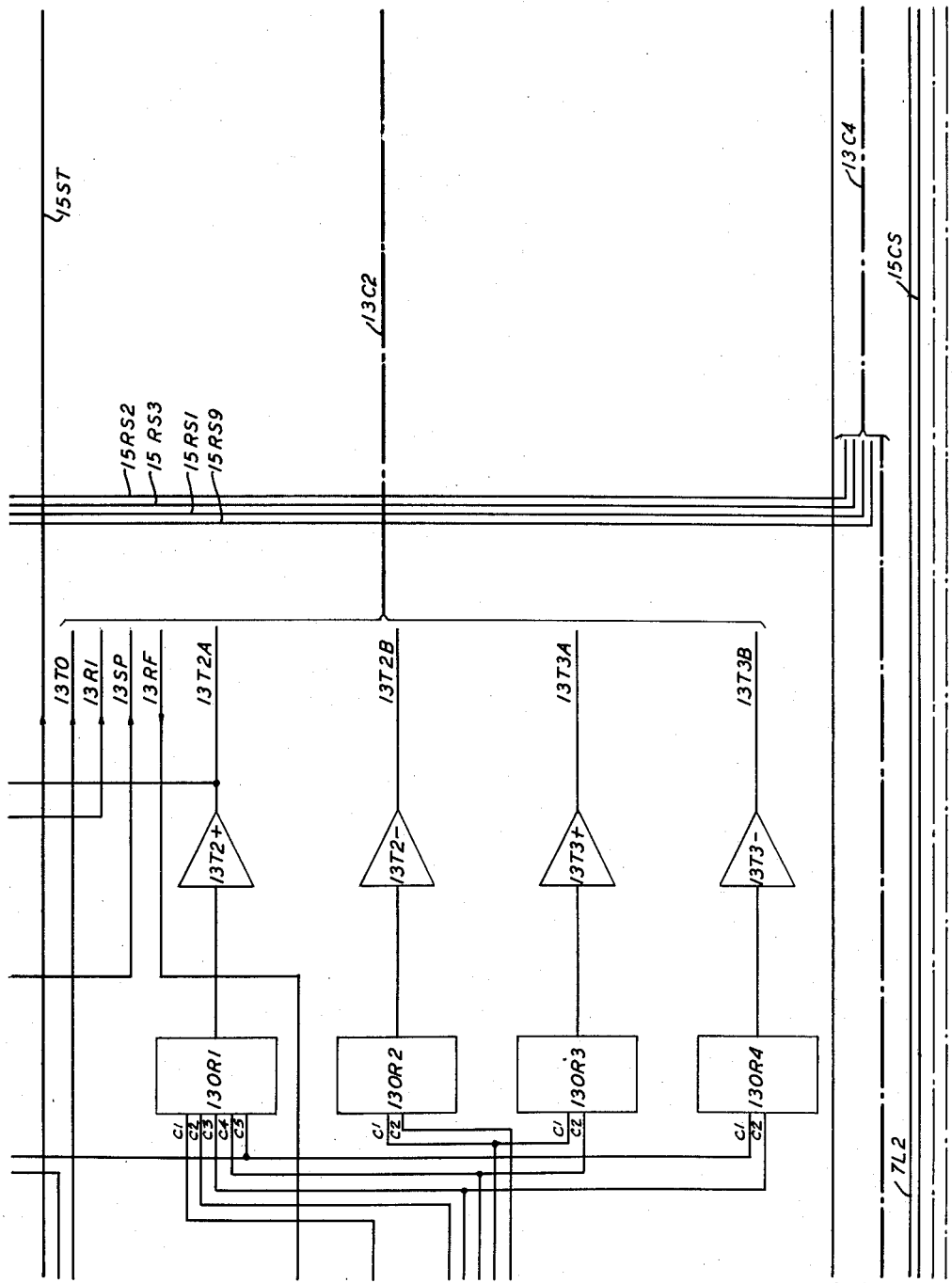
Figure 14:
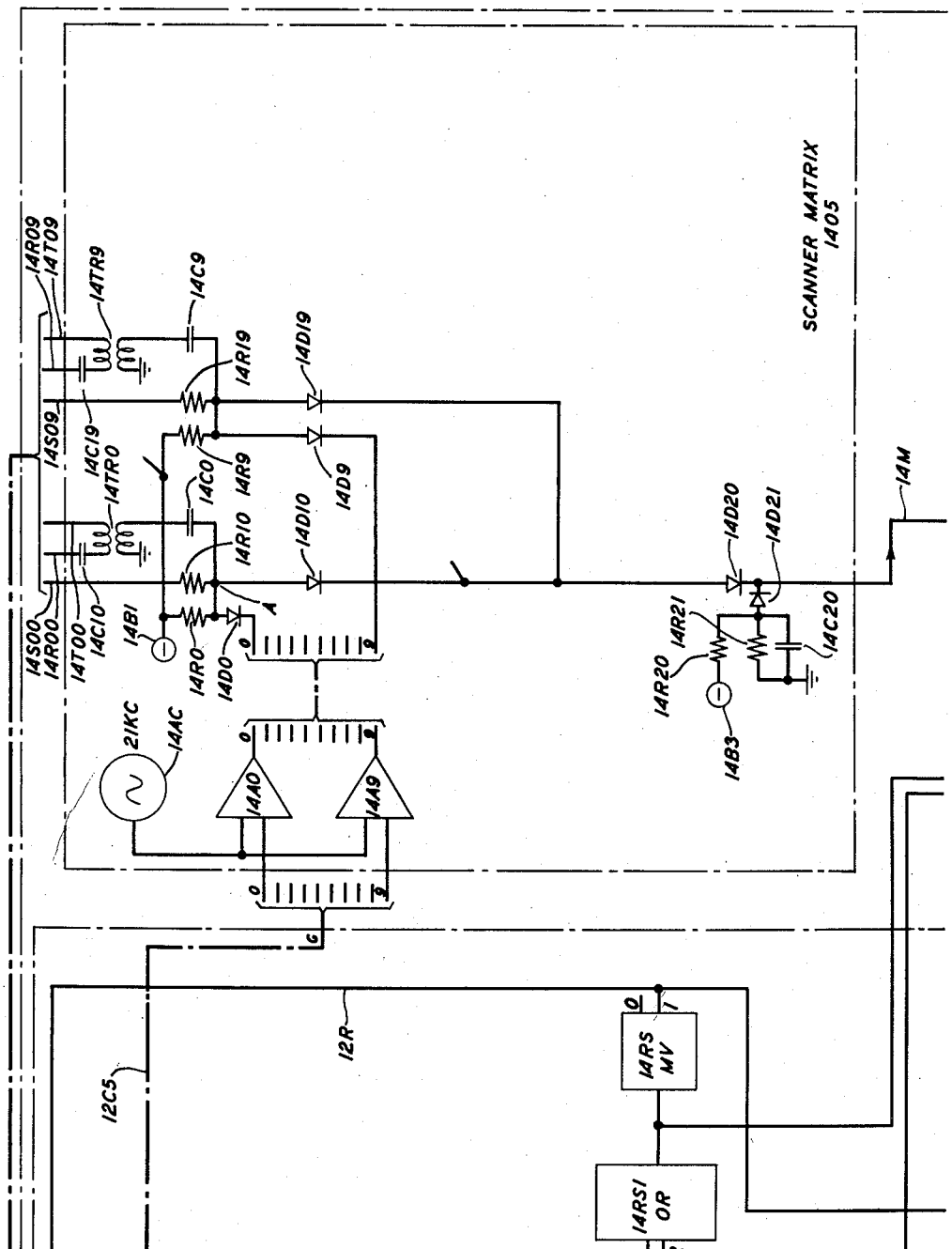

Ten line concentrators 200–09 are connected to the central office equipment, though only one, the line concentrator 200, is shown in partial detail. The line concentrator 200 is shown in FIGS. 2 and 3, the concentrator 209 is shown functionally as a box in FIG. 4 and the other concentrators 201–8 are not shown. Each of the line concentrators 200–09 provides a connection from 60 subscriber stations 3S00–59 to the central office. A station 3S04 is shown connected to the line concentrator 200. The effect of utilizing a line concentrator is to place a part of the switching equipment of the central office at a distance therefrom in order to conserve outside plant facilities. Each of the line concentrators 200–09 is connected to the central office by ten trunks 3T0–9 and two control pairs 2CP1–2. Each set of trunks 3T0–9 provides talking paths between the connected one of line concentrators 200–09 and the central office, and each set of two control pairs 2CP1–2 provides signaling paths to and from the central office equipment.

With 60 subscriber lines, such as line 3L04, connected to each of the ten line concentrators 200–09, there are a total of 600 subscriber lines which are served by the central office equipment. With all 600 subscriber lines idle the central office continuously and synchronously scans the ten groups of 60 subscriber lines.

The ten line concentrators 200–09 are synchronously scanned under control of a scanner pulse generator 411, which is described in detail in the above-identified disclosure of Joel-Krom-Posin. The scanner pulse generator 411 simultaneously provides scanning pulses, in parallel, through ten concentrator control circuits 500–09 and the ten sets of two control pairs 2CP1–2 to the ten line concentrators 200–09. The concentrator control circuits 500–09 are individually associated with the line concentrators 200–09, but the generator 411 is common to the concentrators 200–09. The scanner pulse generator 411 also supplies the scanning pulses to a concentrator originating call register 522 which is also common control equipment. The ten line concentrators 200–09 and the register 522 are synchronously and cyclically operated under control of the scanning pulses from the generator 411.

The scanner pulse generator 411 supplies five types of pulses: vertical group pulses, vertical file pulses, reset pulses, readying pulses and timing pulses. As in the ordinary crossbar telephone system, the subscriber lines are arbitrarily arranged in vertical groups, vertical files and horizontal groups. Such crossbar systems are described, for example, in the above-identified patent granted to A. J. Busch. All the subscriber lines connected to one of the ten concentrators 200–09 are in the same horizontal group and they are subdivided into twelve vertical groups, each of which includes five vertical files. Each of the vertical group pulses supplied by the scanner pulse generator 411 selects a group of five lines connected to each of the line concentrators 200–09. The vertical group pulse is supplied simultaneously to the ten line concentrators 200–09 so that five times ten, or 50 subscriber lines are selected. Between two such vertical group pulses, the scanner pulse generator 411 supplies five vertical file pulses to the concentrators 200–09. The normal scanning pulse sequence is shown in FIG. 17. One subscriber line connected to each of the concentrators 200–09, or ten in all, is scanned by each vertical file pulse. In order to scan the 600 lines, the scanner pulse generator 411 provides to each of the ten line concentrators 200–09 and to the register 522, twelve 15-volt vertical group pulses spaced at intervals of 10 milliseconds and five 15-volt vertical file pulses spaced at intervals of 2 milliseconds between each pair of vertical group pulses. The vertical file and vertical group pulses are ½ millisecond pulses and the complete scanning cycle has a duration of 120 milliseconds.

In addition to the vertical group and the vertical file pulses, the generator 411 supplies one reset pulse at the beginning of the cycle to ensure the synchronous operation of the line concentrator scanning cycles and the originating call register cycle with that of the generator 411. The reset pulse, as is hereinafter described, also functions as the first vertical file pulse so that only 59 vertical file pulses are provided instead of 60 for a single cycle.

To recapitulate, during one scanning cycle, the pulse generator 411 supplies one reset pulse, twelve vertical group pulses and 59 vertical file pulses. One vertical file pulse is provided, if the reset pulse is included, for each of the 60 subscriber lines.

The reset pulse is also supplied from the pulse generator 411 through lead 4RS to the traffic sampler and recorder 700. In the recorder 700, lead 4RS is connected to terminal C2 of the normally disabled AND circuit or gate 11RS1. As is hereinafter described, when the circuit 11RS1 is enabled the reset pulse from the generator 411 functions as a start signal for the traffic sampling and recording sequence of operations.

In addition to the reset pulse, the generator 411 also supplies 60 timing pulses and one readying pulse during each scanning cycle to the traffic recorder 700. The 60 timing or clock pulses are provided through lead 4TP to the normally disabled AND circuit 10TP and the readying pulse is provided through lead 4ARS to the normally disabled AND circuit 7ARS.

The scanner pulse generator 411 also provides the 60 timing pulses to the circuits 500–9. The timing pulses are utilized, as is hereinafter described, when a call to or from one of the 600 subscriber lines is being serviced or when telephone traffic is being sampled.

In the concentrator control circuit 500, the vertical file pulses are supplied through a switch 5SW, an amplifier 5VF and the primary of a transformer 5T1. The secondary of transformer 5T1 is connected through the control pair 2CP1 to the concentrator 200. The vertical group pulses are supplied through the switch 5SW, an amplifier 5VG and the upper primary of transformer 5T2. The secondary of transformer 5T2 is connected through the control pair 2CP2 to the concentrator 200. The reset pulses are supplied through switch 5SW, an amplifier 5R, and the other side of the upper primary of transformer 5T2. The switch 5SW is utilized, as is hereinafter described, to switch the pulsing paths from the concentrator 200 to a line selection and test circuit 912.

During the normal scanning cycle, the scanner pulse generator 411 continuously and cyclically provides the vertical group, vertical file and reset pulses to the line concentrator originating call register 522 and to the ten line concentrators 200–09. Each of the concentrators 200–09 includes a vertical group ring counter 2VG and a vertical file ring counter 2VF which are cyclically operated under control of the generator 411. Ring counters are well known in the art and similar counters are described for example, in the above-identified disclosures of Almquist-Joel-Posin and Joel-Krom-Posin. The vertical file, vertical group and reset pulses are supplied through the ten sets of two control pairs 2CP1–2 to the ten sets of ring counters 2VG and 2VF which are cyclically and synchronously operated, together with the register 522.

At the line concentrator 200 the control pairs 2CP1–2 are connected, respectively, to the secondaries of the transformers 2T1–2. The primary of the transformer 2T1 is connected to the vertical file receiving amplifier 2VFA, and the upper primary winding of the transformer 2T2 is connected to the vertical group receiving amplifier 2VGA. The upper primary winding of the transformer 2T2 is also connected to the reset amplifier 2RS.

The amplified vertical file pulses are supplied from the amplifier 2VFA to an input terminal P of the five-stage vertical file ring counter 2VF. The amplified vertical group pulses are supplied from the amplifier 2VGA through the blocking amplifier 2BVG to the input terminal P of the twelve-stage vertical group ring counter 2VG. The amplified reset pulses from the amplifier 2RS are supplied through the blocking amplifier 2BR to the reset terminals R of the counters 2VF and 2VG. The counters 2VF and 2VG are stepped, in this manner, by the vertical group and vertical file and reset pulses from the generator 411. The blocking amplifiers 2BVG and 2BR function, respectively, as normal amplifiers for the vertical group and reset pulses. When, however, as is hereinafter described, a line busy or a service request pulse is provided to the central office, the amplifiers 2BVG and 2BR function, respectively, to block the reflection of a pulse through the transformer 2T2 from appearing at the blocking amplifier outputs.

The amplifier 2BR is also connected to the reset terminal R of the flip-flop circuit 2M. The circuit 2M is a bistable device which is set when an input pulse is provided at its terminal 1 and is reset when a pulse is provided at terminal R. The reset pulse insures that the flip-flop circuit 2M is reset at the beginning of each scanning cycle.

As long as there are no service requests from any of the ten sets of 60 subscriber lines 3L00–59, or a terminating call thereto, the ten sets of counters, one in each of the line concentrators 200–09, synchronously step through the count of 60, with a reset pulse being supplied at the beginning of each cycle to insure synchronization.

At each combination of vertical file and vertical group pulses, a pulse is directed at the concentrator 200 to scan one of the 60 lines 3L00–59 by 60 line scanning units 3SC00–59 which are individually associated therewith. Only unit 3SC04 is shown in the line concentrator 200. Each of the line scanning units 3SC00–59 has two gating circuit components, one controlled by the counters 2VF and 2VG and the other controlled by the condition of its associated line. The first gating circuit component which includes the varistor 3D functions as an enabling or reading component for the scanning unit.

The ring counter 2VG functions to successively ready groups of five line scanner units at a time, by changing the reverse bias across the varistor 3D from minus 20 volts to minus 2 volts. When the first stage in counter 2VG is set, a relatively positive potential is provided through resistors 3VG of the five line scanner units 3SC00–4 to the respective varistors 3D. The five varistors 3D in the units 3SC00–4 become biased to allow the passage of pulses from the ring counter 2VF through capacitors 3VF. The varistors 3D in the other 55 units 3SC05–59 remain reversed biased by the counter 2VG.

The ring counter 2VF provides scanning pulses successively to twelve line scanning units at a time. When the last counter stage, for example, is set, a positive pulse is provided to the capacitors 3VF in the units 3SC04, 3SC09, 3SC14, 3SC19, 3SC24, 3SC29, 3SC34, 3SC39, 3SC44, 3SC49, 3SC54 and 3SC59. Of these, only the unit 3SC04, however, has been readied at this time by the ring counter 2VG. The positive pulse from the last stage of counter 2VF, therefore, is connected through the capacitor 3VF of the unit 3SC04, varistor 3D and capacitor 3C to the varistor 3S. The varistor 3S is part of the second gating circuit component which is controlled by the line condition.

In the unit 3SC04, the line 3L04 has associated therewith a resistor 3GS, which is connected from the ring lead R to the plus 5-volt battery 3B1, and a resistor 3ES which is connected from the tip lead T to the minus 20-volt battery 3B2. If the subscriber line 3L04 is open, the minus 20-volt battery 3B2 functions, through a resistor 3BT, to reverse bias the varistor 3S so that the scanning pulse from the ring counter 2VF is not transmitted through the varistor 3S. When, however, the subscriber line 3L04 is in a calling condition with the line closed, a circuit is completed from battery 3B1 through resistor 3GS, substation 3S04, and resistor 3ES to battery 3B2. The potential at the junction between varistor 3S and capacitor 3C becomes sufficiently positive to allow the scanning pulse from the last stage of the ring counter 2VF to pass through the varistor 3S and amplifier 2SR to the lower primary of transformer 2T2.

The scanning units 3SC00–59, in this manner, allow the vertical file pulses to pass through as a service request pulse when both gating circuit components are enabled. The first component, which includes varistor 3D, is enabled by the counter 2VG, and the second component, which includes varistor 3S, is enabled when the associated line is closed. However, when the line 3L04 is connected to one of the trunks 3T0–9 and is therefore in a busy condition, the varistor 3S, as is hereinafter described, is also reverse biased.

If all the lines 3L00–59 remain idle the scanning sequence continues under control of the three sets of pulses; the vertical group, the vertical file and the reset pulses from the central office. Each vertical group pulse readies five line scanning units, and each vertical file pulse scans one of the five readied line scanning units. In this manner, the five readied line scanning units are successively scanned by the five vertical file pulses which occur between two of the vertical group pulses.

At the time position for the first vertical file pulse, the vertical file pulse is actually omitted, as described above, and a reset pulse is transmitted from the central office to insure that the counters 2VG and 2VF are in the start position. When the first stage of counter 2VF is reset, it supplies a scanning pulse to the scanning unit 3SC00.

*Normal traffic recorder scanning*

The traffic sampler and recorder 700 functions to record the following principal items of information:
 (1) Concentrator line usage;
 (2) Concentrator trunk usage;
 (3) Call destination (intraconcentrator or other);
 (4) Dial-tone speed; and
 (5) The reason for terminating the request for dial-tone.

Figure 19:
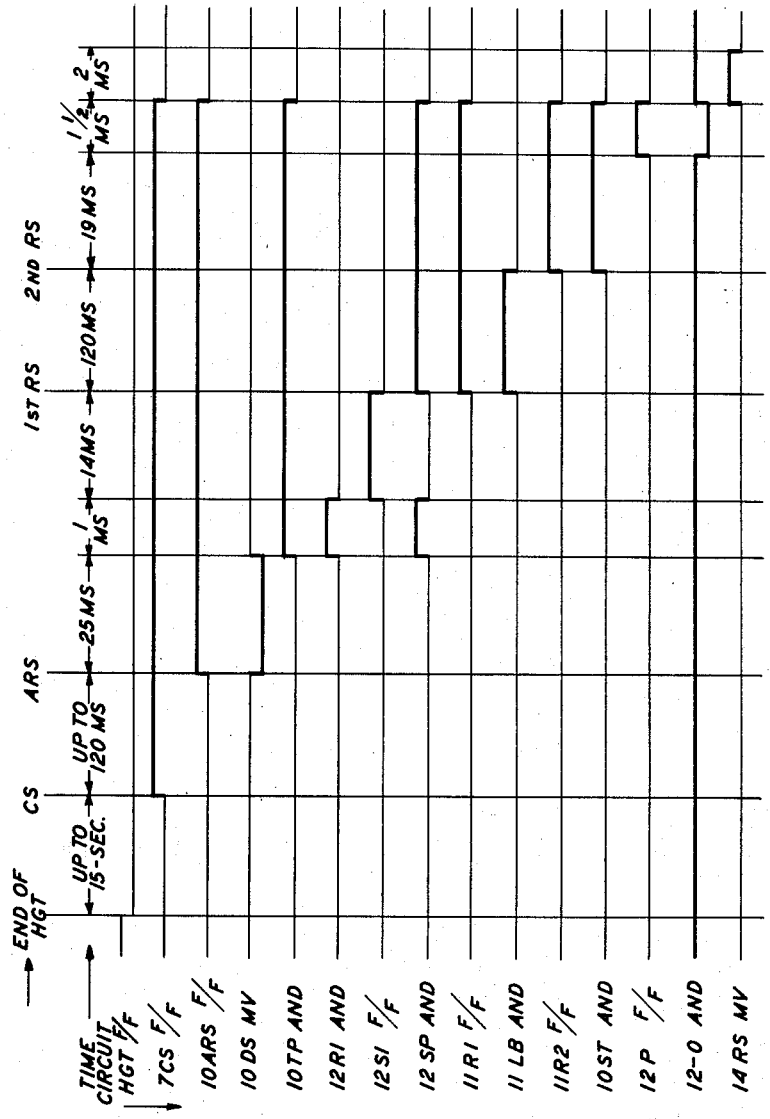
FIG. 19 is a time sequence chart for a normal subscriber and trunk scan of the traffic recorder of this invention.
Figure 20:
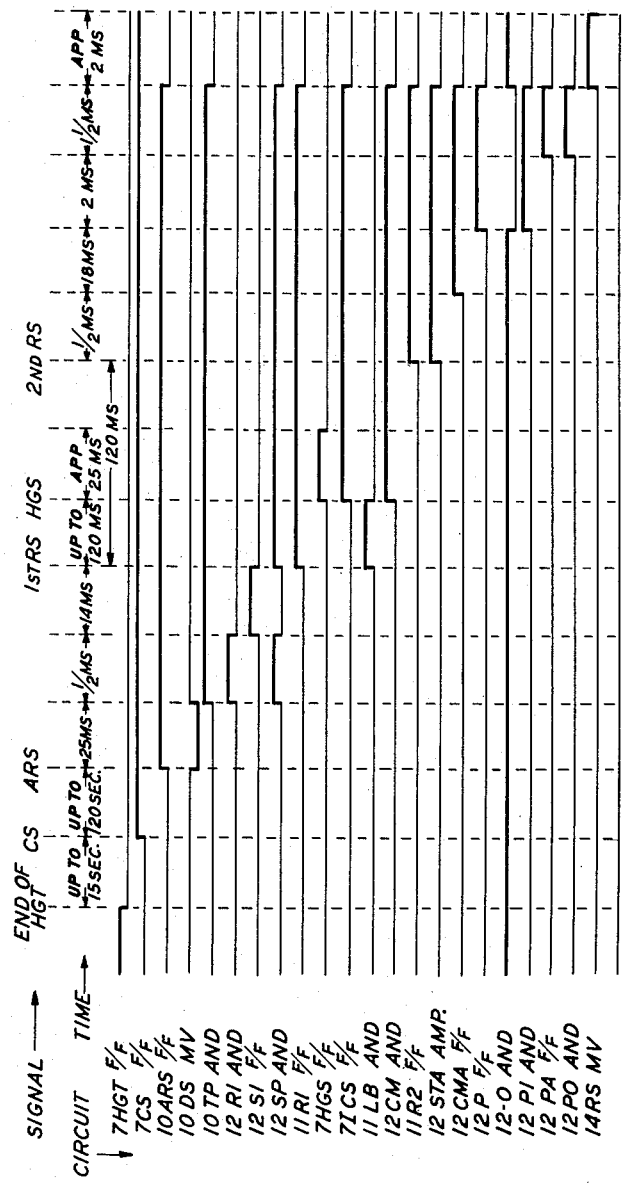
FIG. 20 is a time sequence chart for an interrupted subscriber and trunk scan of the traffic recorder of this invention.
Figure 21:
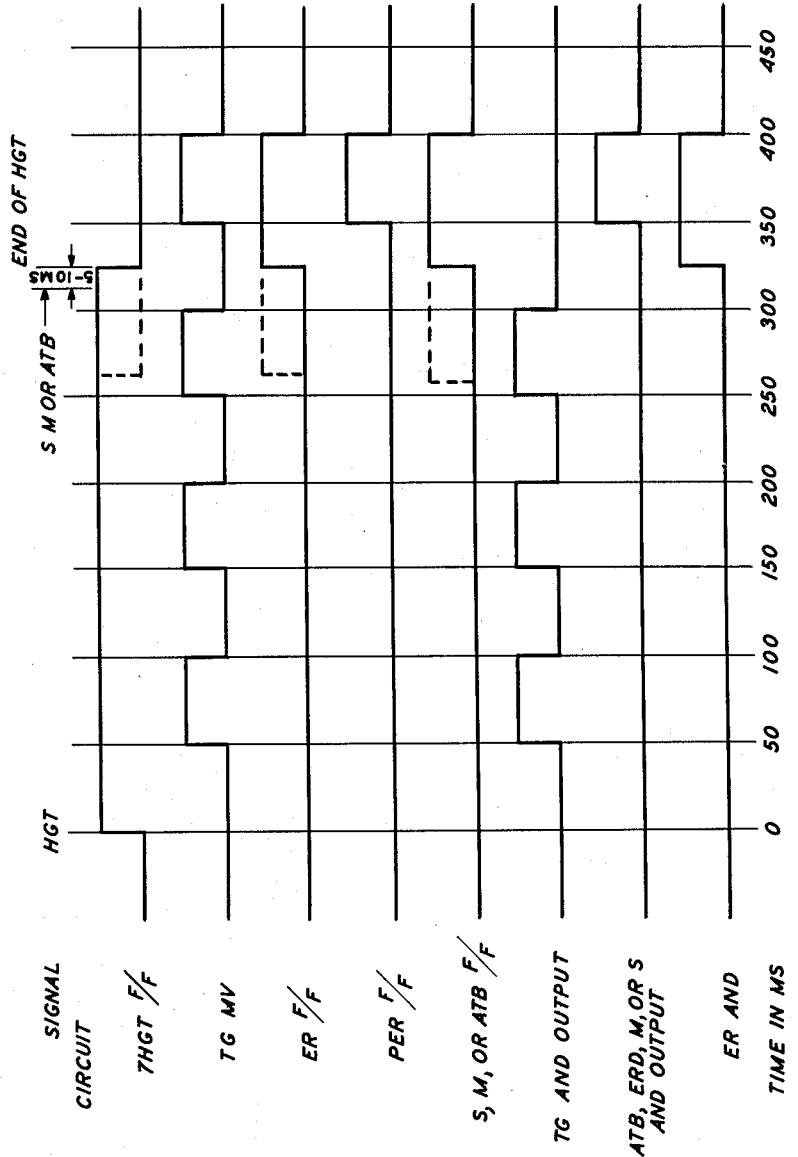
FIG. 21 is a time sequence chart for a normal dial tone measurement operation of the traffic recorder of this invention.
Figure 22:
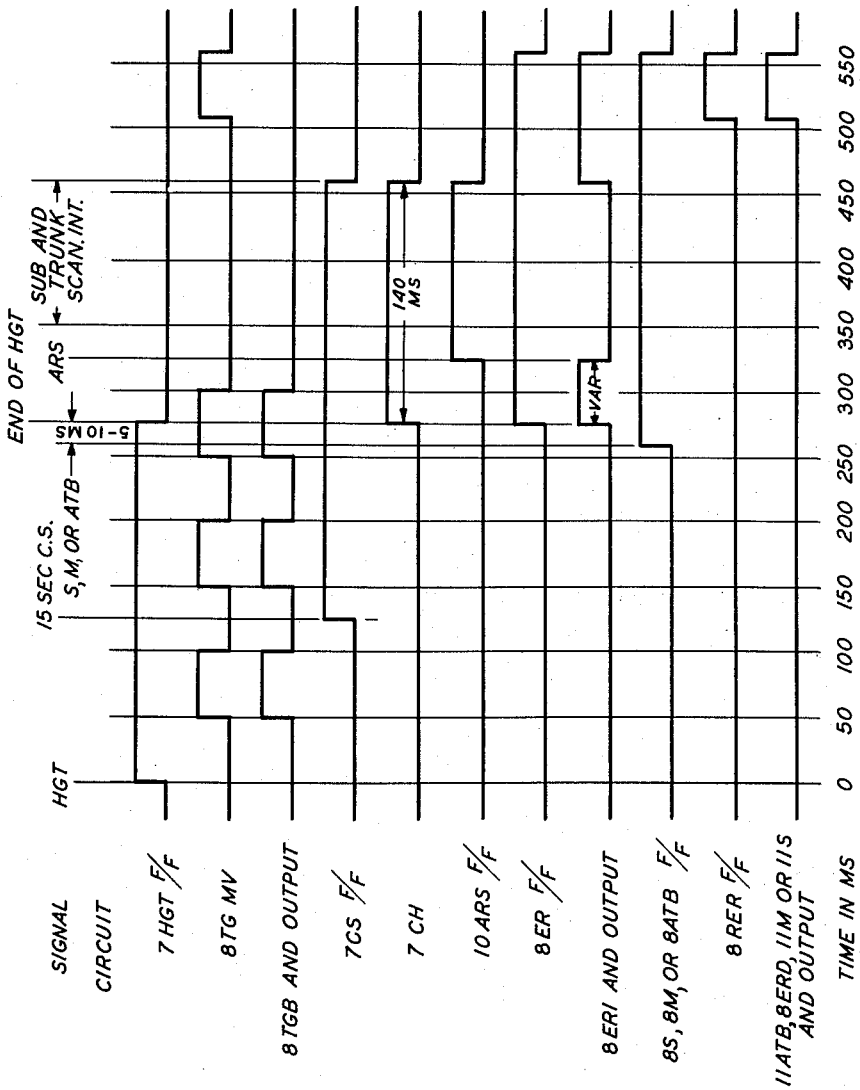
FIG. 22 is a time sequence chart for an interrupted dial tone measurement operation of the traffic recorder of this invention.

The operation of the traffic sampler and recorder 700 is described in conjunction with a number of time sequence charts shown respectively in FIGS. 19–24 which are identified as follows:
 (1) Normal line and trunk scan (FIG. 19);
 (2) Interrupted scan (FIG. 20);
 (3) Dial-tone measurements (FIG. 21); and
 (4) Interrupted dial-tone measurements (FIG. 22).

The traffic recorder 700 scans each of the 60 subscriber lines of one of the line concentrators 200–9 every 15 seconds during a number of daily recording sessions. The switches 620 and 720 are utilized to select the line concentrator to be scanned. Switches 620 and 720 may be manual switches or stepping switches which are stepped after each concentrator is scanned. If switches 620 and 720 are automatic, the traffic conditions of the lines 3L00–59 connected to all ten concentrators 200–9 may be automatically and sequentially sampled and recorded. With the switches 620 and 720 set for the line concentrator 200, the traffic recorder 700 is ready for scanning the 60 lines 3L00–59 connected to the concentrator 200. During the scanning interval, a recording is made of the condition of each of the lines 3L00–59 and the condition of each of the ten trunks 3T0–9 which are connected to the line concentrator 200.

With the switches 620 and 720 set, a sampling of the traffic conditions of the subscriber lines 3L00–59 and of the trunks 3T0–9 for the concentrator 200 is periodically initiated by a clock control 1501 which is described in the above-identified disclosure, by W. R. Young, Jr. Generally the clock control 1501 is set to intiate two recording periods or sessions during the day: one in the morning and one in the afternoon. At the beginning of each session, the control 1501 applies a minus 130-volt reset pulse through lead 15AST to the multivibrator 14RS which provides a single output pulse when it is triggered. When the multivibrator 14RS is triggered, it readies the recorder 700 for the recording session by resetting all of the flip-flop circuits therein except for a few which are independently reset during the operation of the recorder 700. The independently reset flip-flop circuits, which are hereinafter described, are circuits 11LB, 8ER, 8S, 8M, 8ATB, 7HGT and 7HGS. The circuits 7HGT and 7HGS automatically reset when the set pulse thereto terminates and the circuits 11LB, 8ER, 8S, 8M and 8ATB are automatically reset during the subsequent operating sequence.

The application of the ready potential to lead 15AST by the clock control 1501 insures that the recorder 700 is ready for operation and that no false information is stored therein. The output of the multivibrator 14RS is amplified in parallel by four double section amplifiers 15A1–4 and by the amplifier 15A5. The amplifiers 15A1–4 include two independently operating amplifiers with the amplifiers 15A1–3 having the single input connected to both amplifiers. The amplifier 15A4 has two inputs and the input from the multivibrator 14RS only is amplified to lead 15RS7. The input of the lower section of the amplifier 15A4 is connected to terminal 1 of the multivibrator 14RS through the normally enabled AND circuit 15DEL. The AND circuit 15DEL is normally enabled because its input terminal C1 is connected to the output terminal 0 of the flip-flop circuit 71CS which, as is hereinafter described, is operated when a terminating call is being served by the circuits 500–9. With the circuit 15DEL enabled the reset pulse is amplified through the amplifier 15A4 to lead 15RS8 as well as to lead 15RS7. The reset leads 15RS1–9 from the amplifiers 15A1–5 are connected to the reset terminals of the flip-flop circuits in the recorder 700. For example, lead 15RS1 is connected through cable 13C4 to the reset terminal of a flip-flop circuit 12P.

With the recorder 700 ready for a recording session, the clock control 1501 provides a start potential over lead 15CS every 15 seconds to initiate a line and trunk scan. The start potential is minus 130 volts and has a duration of approximately ½ second. During the first, or A.M., recording session the clock control 1501 also provides a control potential over lead 15PM. Lead 15PM is connected to the control terminal of an AND circuit or enabling gate 12PM, the function of which is hereinafter described. Lead 15CS is connected to the flip-flop circuit 7CS which is similar to the circuit 5HGT except that it has a "0" output terminal as well as the normal or "1" output terminal. The "1" terminal is the same as terminal 2 of circuit 5HGT. When the circuit 7CS is normal or unoperated, terminal 0 is at a control or operate potential and terminal 1 is at a normal or non-operate potential. When the circuit 7CS is set by the clock control circuit 1501 the potentials at the two terminals are reversed.

When the flip-flop circuit 7CS operates, it readies the AND circuit 7ARS which has seven control or input terminals C1–C7 and an output terminal. All seven terminals C1–C7 must be at the control or operate potential in order for the potential at its output terminal to change. Such circuits are well known in the art and are described, for example, in the Patent 2,627,039 granted on January 27, 1953 to W. H. MacWilliams, Jr. and in Patent 2,954,483, granted September 27, 1960 to W. Ulrich. The enabling conditions for circuit 7ARS are tabulated below and exemplify the type of operation of other AND circuits which are part of the traffic recorder 700:

(1) Terminal C1—A pulse must be provided on lead 4ARS by the scanner pulse generator 411;
(2) Terminal C2—The flip-flop circuit 7CS must be operated;
(3) Terminal C3—The flip-flop circuit 7HGT must be normal;
(4) Terminal C4—The flip-flop circuit 7HGS must be normal;
(5) Terminal C5—A flip-flop circuit 7ICS must be normal;
(6) Terminal C6—A multivibrator circuit 8TG must be normal; and
(7) Terminal C7—A flip-flop circuit 10ARS must be normal.

All seven of the above conditions must be met in order for the potential at the output terminal of the AND circuits 7ARS to change. When the flip-flop circuit 7CS is set by the clock control circuit 1501, the last six conditions are met so that an output will be provided from the AND circuit 7ARS when the next pulse appears on lead 4ARS.

In addition to readying the AND circuit 7ARS, the operation of the circuit 7CS enables the AND circuits 7CH and 7T0. The circuits 7CH and 7T0 each have three control terminals C1–C3 instead of seven, as described above, for the AND circuit 7ARS. Each of the terminals C1–C3 of both circuits 7CH and 7T0 is at the control or operate potential after the circuit 7CS is set. When the AND circuit 7CH is enabled an output potential is provided through lead 6CH to each of the ten concentrator control circuits 500–9. The output or concentrator "hold" potential provided through lead 6CH inhibits the reception of service requests at each of the circuits 500–9. In each of the circuits 500–9 the lead 6CH0 is connected through a varistor 504 to the control terminal 3 of the inhibiting gate 5CH. With the gate 5CH inhibited, the service request paths from the concentrator 200–9 to the flip-flop circuit 5HGT are opened. All ten concentrator control circuits 500–9 are operated in this manner by the traffic recorder 700 to inhibit the detection of a service request from any of their associated subscriber lines 3L00–59.

The lead 6CH signals the concentrator control circuits 500–9, therefore, that the recorder 700 is ready to start a scan. During the time that the signal is present on the lead 6CH the concentrator control circuits 500–9 do not accept originating requests for service. A terminating call, however, to any one of the concentrators 200–9, will override this signal and allow the associated one of the concentrator control circuits 500–9 to handle the terminating call in a normal fashion. As is hereinafter described, a terminating call to the concentrators 200–09 causes the disablement of the AND circuit 7CH to remove the hold potential on lead 6CH.

When the AND circuit 7T0 is enabled by the flip-flop circuit 7CS, it provides an output potential to the set terminal of the multivibrator circuit 7T0M. The multivibrator circuit 7T0M is a monostable circuit having an operate time of 300 milliseconds. If circuit 7CS remains set so that the AND circuit 7T0 remains enabled for 300 milliseconds, the multivibrator circuit 7T0M will complete its operation and return the traffic recorder 700 and the line concentrator equipment to normal. When the multivibrator circuit 7T0M operates, it removes its control potential from terminal C3 of the AND circuit 7CH and operates the alarm relay 7ALM which is connected to the battery 7B3. When the circuit 7CH is disabled in this manner, it removes the concentrator "hold" potential allowing the concentrator control circuits 500–9 to serve originating calls. When the relay 7AL operates, it connects the battery 7B3 to an alarm circuit, not shown, for bringing in visible and audible alarms for disabling the recorder circuit 1503. Circuit 1503 is described in the above-identified disclosure by W. R. Young, Jr.

As described above, relay 7CH is effective to initiate a line and trunk scan only if the flip-flop circuit 7HGT is normal or reset. As is hereinafter described, the circuit 7HGT is operated when a service request is received at any of the concentrator control circuits 500-9 and it remains operated as long as the request is being served. If the circuit 7HGT is set when circuit 7CH operates, all three AND circuits 7CH, 7T0 and 7ARS, normally controlled by circuit 7CH, are disabled. The circuit 7CH performs no function therefor if an originating call is being served by the concentrator control circuits 500-9. In other words, during the time an originating call is being served by the concentrator control circuits 500-9, the traffic recorder 700 is locked out, or prevented from initiating a sampling operation. Conversely, if a sampling operation is initiated, originating calls are not served as long as the control or inhibiting potential remains on lead 6CH. If a terminating call is being served, as is hereinafter described, the flip-flop circuits 7HGS and 7ICS are operated to disable the recorder 700 so that a line and trunk scan cannot be initiated.

With the AND circuit 7ARS enabled by the circuit 7CS, the next readying pulse from the scanner pulse generator 411 on lead 4ARS passes through the AND circuit 7ARS to the flip-flop circuit 10ARS. A pulse is provided on lead 4ARS every 120 milliseconds which is once for each scanning cycle as shown in FIG. 17. The readying, or ARS pulse, which precedes the reset pulse provided by the scanner pulse generator 411 by 40 milliseconds, is utilized to condition the traffic recorder 700 for a normal scanning and recording cycle. The pulse provided through the AND circuit 7ARS sets the flip-flop circuit 10ARS, changing the potential conditions at its terminals 0 and 1. When the flip-flop circuit 10ARS operates, it performs the following seven functions:

(1) The circuit 10ARS starts the recorder circuit 1503 by providing a start potential from its output terminal 1 through an amplifier 10TD and a start lead 15ST. The recorder circuit 1503, which is described in the above-identified disclosure by W. R. Young, Jr., is readied or conditioned by the start potential for recording the traffic condition of the 60 lines 3L00-59 and the ten trunks 3T0-9 associated with the line concentrator 200;

(2) The circuit 10ARS disables the AND circuit 7ARS by removing the enabling potential from the control terminal C7 of circuit 7ARS. When the circuit 7ARS is disabled in this manner subsequent ARS pulses from the pulse generator 411 are blocked;

(3) The circuit 10ARS removes the enabling potential at terminal C2 of the AND circuit 8ER1 to disable the circuitry utilized for measuring dial-tone delay;

(4) The circuit 10ARS provides an enabling potential to the terminal C1 of the gate or AND circuit 11RS1 which readies a path for receiving the reset pulse from generator 411. The reset pulse, as is hereinafter described, initiates the scanning interval;

(5) The circuit 10ARS enables the AND circuit 7HGS1 by providing an enabling potential to its control terminal C1. With the gate or circuit 7HGS1 enabled, the traffic recorder 700 is sensitive to the reception of a terminating call indication from the circuits 500-9. If a terminating call is received during the scanning and recording cycle, the traffic recorder 700 is halted;

(6) The circuit 10ARS provides a control potential at terminal C1 of the AND circuit 10TP; and (7) The flip-flop circuit 10ARS operates the multivibrator circuit 10DS.

When the multivibrator circuit 10DS is triggered by the flip-flop circuit 10ARS, it removes the control potential from terminal C3 of the AND circuit 10TP for a duration of approximately 25 milliseconds. During this 25 milliseconds the AND circuit 10TP is disabled so that timing pulses provided through lead 4TP from the pulse generator 411 do not pass through the AND circuit 10TP. At the end of the 25 millisecond disabling interval the multivibrator 10DS restores the enabling potential at terminal C3 of the AND circuit 10TP so that succeeding timing pulses pass through the circuit 10TP. The output of the AND circuit 10TP is coupled through the capacitor 10C1 to the multivibrator circuit 10MS. The multivibrator circuit 10MS is triggered by each timing pulse that passes through the AND circuit 10TP to provide a ½ millisecond control pulse and it restores before the next timing pulse arrives. The pulses provided by the multivibrator 10MS are utilized to control the timing of the recorder 700 and since the multivibrator 10MS is triggered by each of the positive timing pulses, the entire timing of the traffic recorder 700 is controlled from the leading edge of the timing pulses from the pulse generator 411.

The output terminal 1 of the multivibrator circuit 10MS is connected to the AND circuits 10ST, 12SP and 12RI. The AND circuit 10ST is not enabled until a control potential is provided from the flip-flop circuit 11R2 which is operated by the second reset pulse. The AND circuits 12SP and 12RI, however, are enabled by the first pulse provided by the multivibrator 10MS. The pulse from the multivibrator 10MS is supplied to the terminals C1 of the AND circuits 12SP and 12RI. The terminals C2 of the AND circuits 12SP and 12RI are connected to the output terminal 0 of the flip-flop circuit 12SI which is in its normal condition so that an enabling potential is provided at its terminal 0. Terminal C3 of the circuit 12RI is connected to the output terminal 0 of the flip-flop circuit 11R1 which is also normal at this time. The ½ millisecond pulse from the multivibrator 10MS is therefore provided respectively through the AND circuits 12SP and 12RI, the leads 13SP and 13RI through cable 13C2 to the detector, index and data generator circuit 1502. The detector, index and data generator circuit 1502, which is described in the above-identified disclosure by W. R. Young, Jr., receives the information through leads 13SP and 13RI and controls the recorder 1503 in accordance therewith. The circuit 1502 functions generally to control the input information to the recorder 1503. The various information is supplied to the circuit 1502 through leads 13T0, 13R1, 13SP, 13T2A, 13T2B, 13T3A and 13T3B. The circuit 1502 receives the information through these leads and controls the recorder 1503 to record a coded representation of the information on three tracks of a magnetic tape. The recording code is as follows:

| Information | Code | | |
|---|---|---|---|
| | Track 1 | Track 2 | Track 3 |
| Line and Trunk Scan Initiated | − | 0 | 0 |
| Non-Busy | + | 0 | 0 |
| Non-Classified Busy | + | + | 0 |
| Intraconcentrator Busy | + | + | + |
| Incomplete Scan | + | + | + |
| Dial-Tone Timing | 0 | + | 0 |
| End of Request (Match) | 0 | + | + |
| End of Request (Serve) | 0 | + | + |
| End of Request (Abandon) | 0 | + | − |
| End of Request (All Trunks Busy) | 0 | − | − |

As described above, during the first or A.M. recording session, the clock control 1501 provides an enabling potential through lead 15PM to the enabling gate 12PM. With the gate 12PM enabled, the pulse provided through the AND circuit 12RI is coupled through the capacitor 12C3 and the gate 12PM to the set or input terminal of the flip-flop circuit 12SI. The first pulse provided by the multivibrator 10MS in this manner triggers or sets the flip-flop circuit 12SI which removes the enabling potential at terminals C2 of the AND circuits 12SP and 12RI. When the circuits 12SP and 12RI are disabled, further pulses through leads 13SP and 13RI to the detector, index and data generator circuit 1502 are blocked. With an enabling potential provided through lead 15PM by the clock control 1501, only one pulse, therefore, is passed through the AND circuits 12SP and 12RI to the circuit 1502. When the circuit 1502 receives the single pulse through leads 13SP and 13RI, it controls the recorder circuit 1503 to indicate that the sampling interval is during the first recording session.

During the P.M. or second recording session the gate 12PM remains disabled so that the flip-flop circuit 12SI is not reset by the first ½ millisecond pulse provided through the AND circuit 12RI. With the gate 12PM disabled, a series of pulses are provided through the leads 13RI and 13SP to the circuit 1502. The recorder circuit 1503 is controlled in this manner by the circuit 1502 to indicate which recording session is taking place.

Responsive to a pulse on both leads 13SP and 13RI, the circuit 1502 controls the recorder circuit 1503 to provide a negative mark on track 1 of the magnetic tape. Each time a pulse appears on both leads 13SP and 13RI, a negative mark is applied to track 1. Any negative, or (—), mark or marks on track 1 prior to a train of plus, or (+), marks, signifies the beginning of a subscriber and trunk scan.

The multivibrator 10DS, described above, delays the application of the pulses through the leads 13RI and 13SP by 25 milliseconds. This delay is necessary to allow the recording circuit 1503 to come up to operating speed. As described above, the multivibrator 10DS is operated to inhibit or delay the operating sequence for 25 milliseconds at the same time that a start is provided through lead 15ST to the recorder circuit 1503. This sequence is initiated by a pulse through lead 4ARS from the pulse generator 411, 40 milliseconds before the next reset pulse. The reset pulse is provided by the generator 411 through lead 4RS to the traffic recorder 700 to initiate the actual scanning sequence. The 15-millisecond interval from the time the multivibrator 10DS restores until the arrival of the first reset pulse is utilized for providing an indication to the circuit 1502 of which recording session is being initiated.

During the first recording session only one pulse is provided to the circuit 1502. Thereafter the traffic recorder 700 waits until the reset pulse is provided from the generator 411. When the reset pulse is provided from the generator 411 it passes through lead 4RS and the enabling gate or AND circuit 11RS1 to set the flip-flop circuit 11R1. The AND circuit 11RS1 is enabled because terminal C1 is connected to the terminal 1 of the flip-flop circuit 10ARS which was set by the pulse provided through lead 4ARS. When the flip-flop circuit 11R1 operates, it performs the following functions:

(1) It enables the gate or AND circuit 11RS2 to ready a path from the reset lead 4RS to the flip-flop circuit 11R2. The next reset pulse therefore will set the flip-flop circuit 11R2 to end the line scanning portion of the sampling sequence;

(2) It provides an enabling potential to the AND circuit 11LB to ready the AND circuit 11LB for passing a line busy indication from the flip-flop circuit 11LB;

(3) It restores or resets the flip-flop circuit 12SI which was set, as described above, by the first pulse provided through the AND circuit 12RI by the multivibrator 10MS;

(4) It disables the AND circuit 12RI by removing the enabling potential at its input terminal C3. With the AND circuit 10RI disabled and the AND circuit 10SP enabled by the resetting of the circuit 12SI, the ½ millisecond pulses provided by the multivibrator 10MS pass through the AND circuit 12SP, lead 13SP through cable 13C2 to the circuit 1502. The circuit 1502 utilizes the pulses through lead 13SP as a reference for determining the identity of the lines to be scanned and for controlling the circuit 1503 in accordance therewith; and (5) It applies a positive pulse through lead 13TO and cable C2 to the circuit 1502 as an indication that the scanning sequence is beginning.

The reset pulse in this manner initiates the recording cycle after an enabling or readying interval initiated by the ARS pulse through lead 4ARS. Each timing pulse, which is supplied to the traffic recorder 700 after the reset pulse, successively operates the multivibrator 10MS to provide a reference potential corresponding to one of the subscriber lines 3L00–59. The timing pulses occur at intervals of 2 milliseconds so that the entire sampling and recording sequence for the 60 subscriber lines 3L00–59 is 120 milliseconds.

When a pulse is provided on lead 13SP to circuit 1502, the circuit 1502 controls the recorder circuit 1503 to apply a positive mark to track 1 of the magnetic tape. The first positive mark following a minus mark or marks identifies the line 3L00; the second positive mark identifies line 3L01 until the sixtieth positive mark identifies line 3L59. The sixty-first mark identifies trunk 3T0; the sixty-second mark identifies trunk 3T1, etc. A total of seventy positive marks are recorded in track 1 for each normal line and trunk scan. As is hereinafter described, if the scan is interrupted by a terminating call, seventy-one marks instead of seventy are recorded.

If the subscriber line which is being scanned is idle, no further indication is provided to the circuit 1502 so that only the reference pulse through lead 13SP is received thereat. If, however, the subscriber line being scanned is in a busy condition, that is, connected to one of the concentrator trunks 3T0–9, a line busy indication is provided to the circuit 1502 in the time slot allotted to the subscriber line being scanned. Since there are then trunks 3T0–9 connected to the concentrator 200, ten of the 60 lines 3L00–59 can be busy during the scanning sequence.

During the time that the traffic recording scanning cycle is being initiated, the scanner pulse generator 411 continues to supply the scanning pulses to the concentrator 200–9. When one of the lines 3L00–59 connected to the concentrator 200 is busy, a busy pulse is supplied through the control pair 2CP2 to the concentrator control circuit 500. The sequence of operations for establishing a line-to-trunk connection and for steering the vertical file pulse to the control pair 2CP2 as a line busy pulse is hereinafter described. In the concentrator control circuit 500 the line busy pulse is amplified through the amplifiers 5LB and 5BLB and supplied through the capacitor 5C7 and lead 5LB to the switch 720. The switch 720 is set for concentrator 0 so that line busy pulses from the control circuit 500 associated with the concentrator 200 are passed through switch 720 and lead 7LB to set the flip-flop circuit 11LB1. Line busy pulses from circuits 501–9 do not pass through the switch 720. When a line is busy, therefore, the flip-flop circuit 11LB1 is operated during the time slot associated with the busy subscriber line.

When the flip-flop circuit 11LB1 is operated, it provides an enabling potential to terminal C5 of the AND circuit 11LB. Four of the five terminals C1 and C3–5 of circuit 11LB are at an enabling potential at this time: terminal C1 is connected to the output terminal 0 of the flip-flop circuit 11R2 which is normal at this time; terminal C3 is connected to the output terminal 0 of the flip-flop circuit 7iCS which is normal at this time; terminal C4 is connected to the output terminal 1 of the flip-flop circuit 11R1 which is operated at this time; and terminal C5 is connected to the flip-flop circuit 11LB1 which was just operated. The fifth terminal, terminal C2, is connected through lead 13RF and cable 13C2 to the circuit 1502. The circuit 1502 supplies one reference potential, slightly delayed, for each time slot or subscriber line through the lead 13RF to the AND circuit 11LB. When the subscriber line being scanned is idle the AND circuit 11LB remains disabled due to the connection of its terminal C5 to the output terminal 1 of the flip-flop circuit 11LB1. When, however, the line being scanned is busy, the line busy pulse provided to the traffic recorder 700 sets the circuit 11LB1 and enables the AND circuit 11LB. The reference pulse provided through lead 13RF thereafter passes through the AND circuit 11LB, the OR circuit 13OR1, the amplifier 13T2+, lead 13T2A and cable 13C2 to the circuit 1502. The circuit 1502 provides to the recorder circuit 1503 an indication that the line being scanned is busy and a positive mark is recorded in track 2 during the time slot associated with the busy line.

The reference pulse from the circuit 1502 through lead 13RF also performs another function, in that it restores the flip-flop circuit 11LB1. In this manner the flip-flop circuit 11LB1 is always in its normal condition unless operated by a line busy pulse from the circuit 500.

The operation described above for one time slot continues for the 120-millisecond scanning cycle at which time another reset pulse occurs. If a line is idle only the clock pulses, through lead 13SP, are provided to circuit 1502 and if it is busy, a line busy indication through lead 13T2A is also provided.

The second reset pulse from generator 411 passes through the AND circuit 11RS1 and the AND circuit 11RS2 to set the flip-flop circuit 11R2. When the flip-flop circuit 11R2 operates, it performs the following functions:

(1) It disables the AND circuit 7HGS1 by removing the enabling potential at its terminal C3. A terminating call being handled at the central office will thereafter not interfere with completion of the trunk scanning interval hereinafter described;

(2) It enables the AND circuit 10ST for beginning the trunk scanning and recording sequence; and (3) It disables the AND circuit 11LB so that line busy indications are not provided to the circuit 1502.

When the AND circuit 10ST is enabled the ½ millisecond pulses from the multivibrator 10MS are provided through it as well as through the AND circuit 10SP. The output of the AND circuit 10ST is connected to the amplifier 12STA and to the input terminals C1 and C3, respectively, of the AND circuits 12P0 and 12PB which are disabled at this time. The ½ millisecond pulses from the multivibrator 10MS pass through the enabled AND circuit 10ST and the amplifier 12STA to the stepper circuit 12ST. The stepper circuit 12ST may be a cold cathode stepping tube of the type described in the above-identified disclosure by W. R. Young, Jr. or the like. Each pulse provided to the stepper circuit 12ST causes it to step a potential from one of its ten output terminals 0–9 to the next. At the end of the first ½ millisecond pulse a potential is stepped from terminal N to the output terminal 0 of the stepper circuit 12ST. The pulse of the output terminal 0 of the stepper circuit 12ST is provided through the AND circuit 12-0 and the cable 12C5 to the amplifier 14A0. The output terminals 1 through 9 are connected through the cable 12C5 respectively to the amplifiers 14A1–9 in the scanner matrix 1405. The scanner matrix 1405 is controlled by the pulses through the cable 12C5 from the stepper circuit 12ST to scan the ten trunks 3T0–9 connected to the line concentrator 200. The switch 620 determines which set of ten trunks 3T0–9 is to be scanned. In the illustrative scanning sequence described herein, the switch 620 was set so that the trunks 3T0–9 of concentrator 200 are connected to the scanner matrix 1405.

The ten amplifiers 14A0–9 are connected respectively to the varistors 14D0–9 which are normally reverse biased by the minus 48-volt battery 14B1. The battery 14B1 is respectively connected to the varistors 14D0–9 through the resistors 14R0–9. The varistors 14D0–9 are also connected through the resistors 14R10–19, respectively, leads 14S0–09, and switch 620 to the sleeve leads 6S0–9 in the line link frame 600. The sleeve leads 6S0–9 are not connected to the concentrator 200 but are utilized in the frame 600 and between the frame 600 and 601 as described in the above-identified disclosure by Joel-Krom-Posin. When trunk 3T0 is idle, the minus 48-volt potential source 14B1 functions to reverse bias the varistor 14D0. When trunk 3T0 is busy, the sleeve lead 6S0 is at ground potential to forward bias its associated varistor 14D0 in the scanner matrix 1405. The pulse from the amplifier 14A0 reverse biases the forward biased varistor 14D0. The varistors 14D0–9 are connected respectively through the oppositely poled varistors 14D10–19 and a serially connected varistor 14D20 to the matrix output lead 14M. When varistor 14D0 is reverse biased by the positive pulse from the amplifier 14A0, the potential at junction A between the varistors 14A0 and 14A10 increases to provide a pulse through the varistors 14D10 and 14D20 to the output lead 14M. The varistors 14D10–19 form effectively an OR circuit arrangement to the lead 14M. The lead 14M is normally at a potential of minus 40 volts due to the connection through the varistor 14D21 to the voltage divider consisting of resistors 14R20 and 14R21. The resistors 14R20 and 14R21 are serially connected between the minus 48-volt potential source 14B3 and ground. Resistor 14R21 is shunted by a capacitor 14C20. The positive pulse through varistor 14D20 reverse biases varistor 14D21 to allow the potential on lead 14M to increase. In this manner if the trunk 3T0 is busy so that the sleeve lead 6S0 is at ground potential, a positive pulse appears on lead 14M when the output potential from the stepper 12ST is stepped to its terminal 0. If trunk 3T0 is idle, the potential at lead 14M remains at minus 40 volts when the sleeve lead 6S0 is scanned because the varistor 14D0 is only further reversed biased by the positive pulse through amplifier 14A0.

In addition to the pulse from the stepper circuit 12ST, a 21-kilocycle alternating-current source 14AC is connected to the amplifiers 14A0–9. When the varistor 14D0 is forward biased, the super audible, alternating-current signal is supplied through the varistor 14D0, and a capacitor 14C0 to the grounded primary of a transformer 14TR0. The varistors 14D0–9 are connected respectively through the capacitors 14C0–9 to the primaries of the transformers 14TR0–9. The secondaries of the transformers 14TR0–9 are connected respectively through the capacities 14C10–19 to the leads 14R00–09 and also to the leads 14T00–09. The leads 14R00–09 and 14T00–09 are connected through the switch 620 to the tip and ring leads of the trunks 3T0–9. When the trunk 3T0 is idle so that the varistor 14D0 is reverse biased, the superaudible tone, provided through the amplifier 14A0, is blocked or greatly attenuated by the varistor 14D0. When, however, trunk 3T0 is busy so that the varistor 14D0 is forward biased, the tone is provided through amplifier 14A0, varistor 14D0, capacitor 14C0, transformer 14TR0, capacitor 14C10, leads 14R00 and 14T00, switch 620, to the tip and ring leads of trunk 3T0. In this manner when one of the trunks 3T0–9 is idle the tone thereto is blocked and when it is busy a superaudible tone is supplied to the tip and ring leads thereof. The subscriber, whose line is connected to the busy trunk, will be unaware of the presence of the tone because its frequency is above audibility. The presence of the tone does not interfere in any way with the normal functioning of the line concentrator components.

The tone from the source 14AC is not supplied to the circuit 1502 through lead 14M as it is shunted to ground through the forward biased varistor 14D21 and capacitor 14C20. The varistor 14D21 is forward biased even when the trunk 3T0 is busy because the potential at point A, though increased, is less than minus 40 volts, when trunk 3T0 is busy. Though the potential drop forward biasing varistor 14D21 decreases when the trunk 3T0 becomes busy, the varistor 14D21 remains sufficiently forward biased to provide an adequate shunting path to ground for the superaudible tone. Varistor 14D21 remains forward biased until trunk 3T0 is scanned and a positive scanning pulse is provided through the amplifier 14A0.

When a pulse appears from any of the amplifiers 14A0–9, the varistor 14D21 becomes reverse biased. The tone is generally blocked, however, when a pulse is provided from one of the amplifiers 14A0–9 because the pulse reverse biases the associated one of the varistors 14D0–9 even if the associated one of its trunks 3T0–9 is busy.

The alternating-current signal is blocked unless an intraconcentrator call is taking place. If an intraconcentrator call is taking place, two of the trunks 3T0–9 are busy for the call and the two associated varistors 14D0–9 are forward biased. The alternating-current signal is therefore supplied to the talking circuit including the two trunks through the two forward biased varistors. For example, if line 3L00 is connected to line 3L04, both of concentrators 200, through the trunks 3T0 and 3T9, the tone or signal is applied to the talking connection through the varistor 14D0 and also through the varistor 14D9. The tone through both varistors 14D0 and 14D9 is shunted to ground through the forward biased varistor 14D21. When trunk 3T0 is scanned, varistor 14D0 is reverse biased, varistor 14D10 is forward biased and varistor 14D21 is reverse biased. When varistor 14D0 is reverse biased it blocks the tone through the amplifier 14A0 and provides, as described above, for a positive pulse to the circuit 1502. When the varistor 14D21 is reverse biased it opens the shunting path to ground. Varistor 14D9, which is forward biased because trunk 3T9 is busy, provides a path for the tone through the transformer 14TR9, leads 14T09 and 14R09, switch 620, trunk 3T9, frame 600, frame 601, intraoffice trunk 602, back through frames 601 and 600, trunk 3T0, switch 620, leads 14T00, 14R00, transformer 14TR0, capacitor 14C0, varistor 14D10, varistor 14D20 and lead 14M to the circuit 1502. The alternating-current signal is provided in this manner to the circuit 1502 only when an intraconcentrator call is established and one of the two trunks utilized for the call is being scanned. If the trunk being scanned is busy, but not for an intraconcentrator call, only a positive pulse without the tone is supplied to the circuit 1502.

If trunks 3T0 and 3T9 are busy, but neither for an intraconcentrator call, the tone through varistor 14D9 is attenuated by the reverse biased varistor 14D19 when trunk 3T0 is scanned. Similarly when trunk 3T9 is scanned, the tone through varistor 14D0 is attenuated. It is only for an intraconcentrator call that the tone is supplied to the circuit 1502. When circuit 1502 receives the intraconcentrator busy indication, it controls circuit 1503 to provide a positive mark on tracks 2 and 3 as well as track 1. As tabulated above, the combination of positive marks on tracks 1–3 identifies the trunk being scanned, that the trunk is busy, and that the call is an intraconcentrator call.

The sequence of operations described above for scanning trunk 3T0 is repeated for each of the trunks 3T1–9 as the stepper 12ST steps the output potential through its terminals 1–9: if the trunk being scanned is idle, no indication is provided to circuit 1502; if the trunk being scanned is busy, a positive pulse in the time slot corresponding to the trunk is provided to circuit 1502; and if the trunk is busy for an intraconcentrator call, an alternating-current signal is superimposed over the positive busy signal.

When the ninth pulse is provided to the stepper 12ST, the change in potential at its terminal 9 causes the operation of the flip-flop circuit 12P in addition to providing for scanning trunk 3T9. When the flip-flop circuit 12P is set, it performs the following functions:

(1) It disables the AND circuit 12–0;

(2) It provides an enabling potential to terminal C1 of the AND circuit 12P1; and (3) It provides an enabling potential to terminal C1 of the AND circuit 12PB.

The next ½ millisecond pulse from the AND circuit 10ST passes through the AND circuit 12BP to the OR circuit 14RS1 to initiate the reset sequence. The pulse through the OR circuit 14RS1 triggers the multivibrator 14RS described above. The operation of the multivibrator 14RS generates one pulse approximately 2-millisecond in duration which restores, as described above, the traffic recorder 700 to its normal condition. In addition to resetting the various flip-flop circuits in the traffic recorder 700, the multivibrator 14RS also provides a reset potential through lead 12R to the stepper 12ST readying it for the next trunk scanning sequence of operations.

The traffic recorder 700 in this manner completes the scanning cycle and restores itself to normal ready to accept the next clock signal on lead 15CS from the clock control 1501 or to perform one of its other functions.

*Originating call*

When a call is initiated at one of the substations 3S00–59, the vertical file pulse from the ring counter 2VF is transformed by the associated one of the scanning units 3SC00–59 to a service request pulse and supplied through the amplifier 2SR to the lower primary winding of transformer 2T2. The amplifier 2SR also supplies a pulse to the blocking amplifier 2BR to prevent a reflected voltage through transformer 2T2 from appearing as a reset pulse. The secondary of the transformer 2T2 is connected through the control pair 2CP2 to the transformer 5T2 in the central office concentrator control circuit 500. The lower primary winding of transformer 5T2 is connected through the receiving amplifier 5SR, the blocking amplifier 5BSR, the inhibiting gate 5CHO and the inhibiting gate 5SRS to the input terminal of the flip-flop circuit 5HGT.

The inhibiting gates 5CHO and 5SRS normally allow the passage of the service request pulses. Each inhibiting gate has three terminals 1–3, with terminal 1 being the input terminal, terminal 2 the output terminal and terminal 3 the control terminal. With minus 20 volts at its control terminal 3, the gate functions to allow passage of pulses from its input terminal 1 through to its terminal 2. Terminal 3 of the gate 5CHO is connected through the resistor 5R2 to the minus 20-volt potential source 5B5 and terminal 3 of the gate 5SRS is connected to the output terminal 2 of the flip-flop circuit 5HGT which provides both the minus 20-volt normal potential and the minus 2-volt inhibiting potential. The gate 5CHO is opened if a terminating call is being served, or if the traffic recorder 700 has initiated a scanning sequence. As described above, when the flip-flop circuit 7CS in the recorder 700 is set, a control potential is provided through the circuit 7CH, lead 6CH and varistor 5D4 to disable or open the gate 5CHO. When the traffic conditions at concentrator 200 are being sampled therefor, the circuit 500 is insensitive to service requests.

If both gates 5CHO and 5SRS are open, circuit 5HGT is operated. The flip flop circuit 5HGT is a bistable transistor trigger circuit of the type described above and also in the above disclosure of Joel-Krom-Posin. An electrical pulse applied to the input terminal 1 of circuit 5HGT triggers the circuit from one state to the other and leaves it there until a reset pulse at its terminal 3 triggers it back again to its former state. When the flip-flop circuit 5HGT is normal, or off, its output terminal 2 is at a potential of minus 20 volts and off-normal, or on, when it has received a positive pulse through its input, or set, terminal 1 the potential at its output terminal 2 changes to minus 2 volts. A positive pulse through the reset terminal 3 restores the potential at its output terminal 2 to minus 20 volts. The time consumed in changing the output potential from one value to another is approximately 2/10 of a microsecond.

The flip-flop circuit 5HGT, which is part of the concentrator control circuit 500, is individually associated with the concentrator 200. The line concentrator system also includes nine other flip-flop circuits 5HGT, not shown, which are in the circuits 501–9 and therefore individually associated with the nine concentrators 201–09. The operation of the circuit 5HGT provides an indication, therefore, of the identity of the concentrator at which the call originated.

More specifically when the flip-flop circuit 5HGT in circuit 500 operates, it performs the following functions:

(1) Switch 5SW in each of the circuits 500–9 is operated to switch the scanning pulse paths to the line selection and test circuit 912;

(2) Gate 5SRS in each of the circuits 500–9 is closed to inhibit recognition of subsequent service requests;

(3) The flip-flop circuit 7HGT in the recorder 700 is operated to disable the AND circuits 7CH, 7ARS and 7T0; with circuit 7ARS disabled, the clock control 1501 cannot initiate a sampling or scanning sequence because the readying or ARS pulse from the pulse generator 411 is blocked. When the circuit 7HGT is operated, it also initiates the dial-tone speed measurement sequence by the recorder 700. The dial-tone speed sequence of operation, which is illustrated in FIG. 21, is hereinafter described after the description of the operating sequence which establishes a talking connection to the calling line 3L04; and (4) Relay 5HGO is operated to call in the marker 915.

When the switch 5SW is operated, the scanning pulses are provided to the line selection and test circuit 912 instead of to the concentrators 200–09 and the originating register 522. The register 522 remains set, therefore, at the calling line identity. For a service request from line 3L04, for example, the register 522 registers the identity of the calling line 3L04 when the scanning pulses thereto are stopped.

When gate 5SRS is closed, the central office becomes insensitive to service requests, and remains in this condition until circuit 5HGT is reset. The terminal 2 of circuit 5HGT of each of the circuits 500–9 is multipled to the control terminal 3 of each gate 5SRS. When a service request is received at one of the circuits 500–09, therefore, all the circuits 500–09 become insensitive to subsequent service requests.

Terminal 2 of circuit 5HGT is also connected to the winding of relay 5HGO which in turn is connected to battery 5B3. When relay 5HGO operates, it connects the minus 20-volt battery 5B3 through its operated armature 2 to the register 522. When the minus 20 volts are applied to register 522, it supplies the vertical group identity of the calling line to the line link marker connector 923.

When relay 5HGO operates, it also closes ground through its operated armature 1 to provide an indication of the identity of the service requesting line concentrator 200, or the horizontal group indication, to the line link marker connector 923. When the vertical group and horizontal group identities are received at the connector 923, a start or seizure signal is provided therefrom to the marker 915.

When the marker 915 receives the start signal from the connector 923, it seizes the line link connector 920 which initiates an outpulsing operation, and a trunk selection operation, in order to establish a connection from the calling line 3L04 to a selected one of the trunks 3T0–9.

When the line link connector 920 is seized by the marker 915, it in turn seizes the relay control and selector circuit 908 and supplies the vertical group identity of the calling line and the concentrator identity thereto, as well as an indication that the call is an originating call.

When the circuit 908 receives the originating call indication it completes a path for receiving the vertical file information from the register 522. When the circuit 908 has the complete calling line identity, it initiates and controls the operation of the line selection and test circuit 912. As described above, when switches 5SW are operated, the scanning pulses are provided to the circuit 912. Under the joint control, therefore, of the generator 411 and the circuit 908, the circuit 912 supplies a reset pulse and the correct number of vertical file and vertical group pulses to set the ring counters 2VG and 2VF at the identity of the calling line.

After the calling line identity has been pulsed to the concentrator 200 the circuit 912 supplies a number of mark pulses through amplifier 5M, transformer 5T1, the control pair 2CP1, transformer 2T1, and an amplifier 2MK, to the input terminal 1 of the flip-flop circuit 2M and also to the trunk circuits 3TR0–9. When circuit 2M is set, it operates relay 2MR, the winding of which is connected to battery 2B1. When relay 2MR operates, it connects battery 2B1 through its operated armature to the windings of relays 2F0–4 and 2G0–11. The windings of relays 2F0–4 are connected, respectively, to the output terminals of the stages in counter 2VF and the windings of relays 2G0–11 are connected, respectively, to the output terminals of the stages in counter 2VG. Since, as described above, a number of vertical group and vertical file pulses indicating the identity of the calling line have been supplied to counters 2VF and 2VG, the counters 2VF and 2VG are set in accordance therewith. When the calling line is line 3L04, the last stage in counter 2VF and the first stage in counter 2VG are set. When a stage is set, a minus 2-volt potential is at the associated terminal thereof. With the first stage in counter 2VG and the last stage in counter 2VF set, when relay 2MR operates, it causes the operation of relays 2G0 and 2F4.

With one of the relays 2F0–4 operated, and one of the relays 2G0–11 operated, a minus 65-volt source 2B2 is connected to one of 60 line circuits 3LU00–59.

There is one line circuit for each of the subscriber lines 3L00–59 though only the circuit 3LU05 is shown. With the counters 2VF and 2VG set at the identity of the calling line, the mark pulses are effective to select the line circuit which is individual to the calling line. Each of the line circuits 3LU00–59 has six crosspoints, or line units 3U0–5, which are connected to the associated subscriber line. The 60 sets of line units 3U0–5 provide for connections between the 60 lines 3L00–59 and the ten trunks 3T0–9. With only six line units for each line, each line is connectable to only six of the ten trunks 3T0–9. The subscriber lines, which are in the same vertical group, are connectable to the same six trunks. For example, as shown in FIG. 18, which is a table of the line-to-trunk connections, the five lines 3L00–4, which are in the vertical group 0, are connectable to the trunks 3T1, 3T6, 3T7, 3T8 and 3T9. As described above, the trunks which are utilized for a vertical group are referred to as a multiple. All twelve multiples are different in order to distribute the load carried by any one rtunk. Such a distribution system of multiples is referred to as a slip multiple and is described, for example, in the patent application, Serial No. 555,929, of Brooks-Joel-Krom filed on December 28, 1955.

As shown in the line unit 3U0, each of the line units 3U0–5 includes a serially connected relay 3C0 and gas tube 3CT. When the relay 3C0 is operated, a connection is provided from the associated line to the associated one of the trunks 3T0–9. When the relays 2F4 and 2G0 are operated, as described above, the minus 65-volt battery 2B2 is connected to the line circuit 3LU04. The battery 2B2 is connected through the operated armature of relay 2F4, and the operated armature 4 of relay 2G0 to the windings of the six relays 3C0 in the circuit 3LU04. The anode of the gas tube 3CT in each of the units 3U0–5 is connected to one of the trunk circuits 3TR0–9 in accordance with the table shown in FIG. 18. The connection from the anode of a tube 3CT is through a varistor 3D3, and resistor 3R5 to the ring of the associated one of trunks 3T0–9. For example, the gas tube 3CT shown in the line unit 3U0 of circuit 3LU04 is connected through the circuit 3TR1 to the trunk 3T1. The tube 3CT does not ionize and the associated relay 3C0 does not operate until a positive connect potential is provided on the tip of the trunk 3T1 connected thereto.

The positive connect potential is supplied over the tip of the selected trunk 3T1 by the circuit 908. As described above, when the circuit 908 is seized by the marker 915, it initiates a trunk selecting sequence as well as the outpulsing sequence. The circuit 908 selects the preferred idle trunk in the group of trunks connectable to the calling line 3L04. The trunk selecting sequence is described in detail in the above-identified disclosure of Brooks-Joel-Krom. When the circuit 908 selects the trunk 3T1, it supplies a plus 100-volt connect potential through the line link frame 600 to the tip of the trunk 3T1 and grounds its associated sleeve lead 6S1.

The combination of the minus 65 volts at the cathode of the tube 3CT and the plus 100 volts at the anode of the tube 3CT in unit 3U0 of circuit 3LU04 causes the ionization of the tube 3CT. When the tube 3CT ionizes, relay 3C0 operates to establish a connection through the unit or crosspoint 3U0 from the calling line 3L04 to the selected trunk 3T1.

When the crosspoint 3U0 of circuit 3LU04 is closed, the mark pulses, which are still being supplied, the returned as line busy pulses through the control pairs 2CP2 to the central office. When relay 3C0 operates, it forward biases a diode 3M2 in circuit 3TR1 to allow for the passage of the mark pulses. The diode 3M2 is normally reverse biased by the battery 3B4, which is connected thereto through the resistor 3L1, varistor 3RV and resistor 3B. The other terminal of varistor 3M2 is connected to ground through the resistor 3M, and to the output of the amplifier 2MK through the capacitor 3C1. When relay 3C0 operates, it extends the connection from the minus 65-volt battery 2B2 through the operated armature 4 of relay 3C0, varistor 3RV and resistor 3L1 to the battery 3B4 locking relay 3C0 operated. The current through resistor 3L1 causes the potential at varistor 3M2 to decrease to allow the passage of mark pulses. With the varistor 3M2 forward biased, the succeeding mark pulses from the central office are supplied through the amplifier 2MK, the capacitor 3C1, varistor 3M2 and capacitor 3CD to the line busy amplifier 2LB. In this manner the succeeding marking pulses are routed back to the central office through the amplifier 2LB as line busy pulses to indicate that the cross-point relay 3C0 has operated. Battery 3B5 in circuit 3TR1 is connected through the inductor 3BT and the operated armature 3 of relay 4C0 in unit 3U0 to reverse bias the varistor 3S. When scanning is resumed, the line 3L04 does not initiate a service request during the time it is connected to the trunks 3T1–9. The scanning pulse from counter 2VF is then directed through capacitor 3VF, varistor 3D, capacitor 3C, the operated armature 3 of relay 3C0, varistor 3M1 and the amplifier 2LB to the control pair 2CP2.

At the central office, the converted mark pulses are provided through the amplifier 5LB, the blocking amplifier 5BLB, the open inhibiting gate 5LBT to the circuit 912. When circuit 912 receives this crosspoint closure indication, it causes the operation of the circuit 908 to provide the crosspoint closure indication to the marker 915, and also to remove the plus 100-volt potential from the tip lead of trunk 3T1.

When the plus 100-volt connect potential is removed from the tip lead of the selected trunk 3T1, tube 3CT extinguishes but relay 3C0 remains operated over the locking path to battery 3B4. The locking path is from battery 3B4, through resistor 3L1, varistor 3RV, the operated armature 4 of relay 3C0, the winding of relay 3C0, and resistor 3CT1 to ground. When the marker 915 receives the crosspoint closure indication it operates the frames 600 and 601 and a register connector 609 to complete a connection from the calling line 3L04 through trunk 3T1 to an originating call register 606. The marker 915 also initiates the release of the connector 920 which, in turn, releases circuit 908.

When circuit 908 releases, it supplies a control potential over lead 9S to the traffic recorder, and it releases circuit 912 which provides a reset pulse through lead 9L1 to terminal 3 of the flip-flop circuit 5HGT in circuit 500. The control pulse over lead 9S to the recorder 700 indicates to the recorder that the service request terminated because dial tone was provided. When the circuit 5HGT is reset, it in turn resets the switch 5SW to restart the scanning cycle. When the switch 5SW is reset, a reset pulse is supplied to the line concentrator 200 and to register 522. The amplifier 2RS, which receives the reset pulse in the concentrator 200, is connected, as described above, to the circuit 2M. The reset pulse is supplied through the amplifier 2RS, the blocking amplifier 2BR, the reset terminal 3 of the flip-flop circuit 2M, causing it to reset. When circuit 2M resets, it releases relay 2MR, which, in turn, releases relays 2F4 and 2G0. Relay 3C0, however, remains operated due to the locking path through its operated armature 4. The normal scanning cycle thereafter continues until another service request is made by one of the lines 3L00–59, or a call is made thereto. The normal scanning sequence continues during dialing and during the establishment of a call-back connection. As described in the above-identified disclosures by Joel-Krom-Posin and Brooks-Joel-Krom, the same trunk utilized for the dialing connection is also utilized for the call-back connection. Once trunk 3T1 is made busy, therefore, it remains busy until one of the subscribers hangs up.

When the subscriber at substation 3S04 hangs up, the opening of line 3L04 is detected at the central office circuit 908. The circuit 908 supplies a minus 130-volt disconnect potential to the tip lead of the trunk 3T1. The disconnect potential is provided through the tip lead of trunk 3T1, resistor 3R5 and varistor 3D2 to the cathode of tube 3DT. The anode of tube 3DT is connected through resistor 3L1 to battery 3B4 so that tube 3DT ionizes. When tube 3DT ionizes, its anode potential becomes more negative to reverse bias the varistor 3RV and open the locking path for relay 3C0. When relay 3C0 releases, it disconnects line 3L04 from trunk 3T1. During the disconnect sequence the normal scanning cycle is continued.

Returning now to the operation of the recorder 700 after circuit 5HGT is set, when circuit 5HGT is operated to recognize an originating call, it in turn operates circuit 7HGT to initiate the dial-tone speed measuring sequence of operations in the recorder 700. When the flip-flop circuit 7HGT operates, it disables the AND circuits 7CH, 7T0 and 7ARS, and it provides an operating potential through the OR gate 8TGA to the slow speed tape drive amplifier 7SS and to the multivibrator 8TG. When an operating potential is provided to the amplifier 7SS, it provides a control potential through lead 7L2 to initiate the operation of the recorder circuit 1503. The control lead 7L2 is one of two leads 15ST and 7L2 which may be utilized to initiate the operation of the recorder circuit 1503. As described in the above-identified disclosure by W. R. Young, Jr., the recorder circuit is operated at a different speed for the sampling sequence of operation and for the dial-tone speed measurement sequence of operation. The recorder circuit 1503 is operated at a greater speed for the sampling sequence than for the measurement sequence of operation.

The multivibrator 8TG is an oscillator circuit which continues to oscillate as long as the flip-flop circuit 7HGT is operated. The multivibrator 8TG has a 100-millisecond cycle, being "on" for 20 milliseconds and "off" for the other 80 milliseconds.

When the multivibrator 8TG is turned "on," it removes the enabling potential at terminal C6 of the AND circuit 7ARS, and it provides an enabling potential to the AND circuits 8TGB, 8ERD, 8SA, 11M and 11ATB. The output terminal 1 of the multivibrator 8TG is also coupled to the AND circuit or enabling gate 8RR. Of the six AND circuits 8TGB, 8ERD, 8SA, 11M, 11ATB and 8RR, only the AND circuit 8TGB is enabled or operated at this time. The pulse through the AND circuit 8TGB passes through terminal C2 of the OR circuit 13OR1, the OR circuit 13OR1, amplifier 13T2+, lead 13T2A through cable 13C2 to the circuit 1502. Each time the multivibrator 8TG operates, a pulse is provided through the amplifier 13T2+ to the circuit 1502 which controls the recorder circuit 1503 in accordance therewith. Since the oscillating period of the multivibrator 8TG is 100 milliseconds, a control pulse is provided to the circuit 1502 every 1/10 of a second that the circuit 7HGT remains operated. It is this control pulse which is utilized by the circuits 1502 and 1503 to time the delay in providing dial tone to the calling subscriber. The central pulses to the circuit 1502 initiate when the circuits 5HGT and 7HGT sequentially operate upon the reception of the service request pulse at the central office.

The request for service can be terminated in one of the four following ways:

(1) The subscriber can be furnished dial tone;
(2) The subscriber can disconnect;
(3) All the trunks available to the calling subscriber 3L04 can be busy; and
(4) The calling line can be seized for a terminating call prior to the time that dial tone is furnished thereto.

The circuit 908 distinguishes between each of the four conditions and provides an indication thereof to the recorder 700 which records a distinctive indication for each in the recorder circuit 1503. When the flip-flop circuit 5HGT is reset, it removes the operating potential from the input terminal of the flip-flop circuit 7HGT allowing it to reset or restore to normal. When the circuit 7HGT restores to normal it provides a negative pulse through the inhibiting gate 70C to set the flip-flop circuit 8ER. The flip-flop circuit 8ER is similar to the flip-flop circuit 7CS, described above, except that it operates on a negative instead of a positive pulse. When the flip-flop circuit 8ER operates, it enables the AND circuits 8RR and 8ER1. The enabled AND circuit 8ER1 applies a direct-current potential to terminal C2 of the OR circuit 8TGA to simulate the originating call signal as applied by the flip-flop circuit 7HGT. The signal through the OR circut 8TGA from the AND circuit 8ER1 maintains the operation of the amplifier 7SS and the oscillation of the multivibrator 8TG. The next positive output of the multivibrator 8TG passes through the enabled gate or AND circuit 8RR to operate the flip-flop circuit 8RER. The operation of the flip-flop circuit 8RER disables the AND circuit 8TGB to block pulses from the multivibrator 8TG to the OR circuit 13OR1, and it enables one of the AND circuits 8ERD, 8SA, 11M and 11ATB. The four circuits 8ERD, 8SA, 11M and 11ATB are associated with the four ways of terminating the request for service which are tabulated above. If a signal is applied on any one of the three leads 9S, 9M or 9ATB at the relay control and selector circuit 908, an associated one of the flip-flop circuits 8S, 8M and 8ATB is operated to enable the associated one of the AND circuits 8SA, 11M and 11ATB and to disable the AND circuit 8ERD. This results in a positive pulse of 50-millisecond duration at the output of one of the circuits 8SA, 11M or 11ATB. The outputs of the AND circuits 8ERD, 8SA, 11M and 11ATB are connected to combinations of the input terminals of the OR circuits 13OR1-4. The OR circuits 13OR1-4 are connected respectively through the amplifiers 13T2+, 13T2—, 13T3+ and 13T3— to the circuit 1502. The circuit 1502 receives the coded signal indicating a particular type of call termination and controls the recorder circuit 1503 in accordance therewith.

In the event the signal is not applied to one of the three leads 9M, 9S and 9ATB by the circuit 908, the AND circuit 8ERD is enabled because all three flip-flop circuits 8S, 8M and 8ATB remain normal. The output of the AND circuit 8ERD controls the OR circuits 13OR1-4 in accordance with a distinctive code which is supplied to the circuit 1502. In this manner the recorder 700 measures the duration of the operation of a flip-flop circuit 5HGT and also records the manner in which the request for service was terminated.

Suppose, for example, the service request terminates because the subscriber is furnished dial tone. When dial tone is supplied to the subscriber, the circuit 908 supplies a control potential over lead 9S, as described above, to the recorder 700. The potential upon lead 9S causes circuit 8S to set. When the circuit 8S is set, it enables the AND circuit 8SA which provides a pulse to the control terminal C4 of the OR circuit 13OR1 and to the terminal C2 of the OR circuit 13OR3. The positive pulses through the circuits 13OR1 and 13OR3 are amplified respectively by the amplifiers 13T2+ and 13T3+ and supplied to the circuit 1502. At the circuit 1502 the positive pulses on leads 13T2A and 13T3A are utilized to control the circuit 1503 to record a positive pulse or mark in tracks 2 and 3 of the magnetic tape. As shown in the table above, a positive pulse on tracks 2 and 3 indicates that the service request being timed was terminated because dial tone was supplied.

During the time that dial-tone delay is being measured, the clock control 1501 may attempt to initiate a line and trunk scan. If the clock control 1501 attempts to initiate a line and trunk scan the dial-tone measurement sequence is interrupted as shown in the time sequence chart of FIG. 22. The subscriber and trunk scan sequence of operation is initiated, as described above, by a clock signal of approximately 1 second duration which occurs every 15 seconds. In the event the clock signal occurs during the delay in furnishing dial tone to a subscriber requesting service, the clock signal fails to initiate a line and trunk scan. If a clock signal is supplied from the control 1501 to lead 15CS during the time an originating call is being served, a clock signal does not interfere with the service of the originating call but it prohibits the concentrator control equipment from accepting another request for service before the line and trunk scanner can be made.

If the clock signal is applied to lead 15CS when an originating request is being served, the flip-flop circuit 7CS is operated but a "hold" signal is not provided through the AND circuit 7CH to lead 6CH because the flip-flop circuit 7HGT disabled the AND circuit 7CH. When the 1 second clock signal is removed from the lead 15CS by the control 1501, the flip-flop circuit 7CS remains operated. When the request for service ends and the flip-flop circuit 7HGT is reset, the AND circuit 7CH is enabled and a "hold" signal is provided to the control circuits 500-9 through lead 6CH. The "hold" signal, as described above, prevents the circuits 500-9 from recognizing subsequent service requests. The multivibrator 8TG which has a period of 100 milliseconds continues to operate as does the amplifier 7SS because, as described above, when the flip-flop circuit 7HGT resets, it operates the flip-flop circuit 8ER. With circuit 7HGT reset, when the ARS or readying pulse occurs, it passes through the AND circuit 7ARS to set the flip-flop circuit 10ARS. When the flip-flop circuit 10ARS operates, it disables the AND circuit 8ER1 which stops the amplifier 7SS and the multivibrator 8TG. The flip-flop circuit 8ER, however, remains operated as does the flip-flop circuit 8S. As described above, the flip-flop circuit 8M or 8ATB may have been operated instead of the circuit 8S to remain operated at this time instead of the circuit 8S. The subscriber and trunk scanning sequence operation thereafter takes place in the manner described above and on completion of the scan when the multivibrator 14RS is operated the flip-flop circuit 10ARS is reset which reenables the AND circuit 8ER1 to restart the amplifier 7SS and the multivibrator 8TG. The multivibrator 8TG makes one more complete cycle of "off" for 80 milliseconds and "on" for 20 milliseconds to record how the request for service was handled. When the multivibrator 8TG is turned on it operates the circuit 8RER. When the flip-flop circuit 8RER operates, it resets the flip-flop circuit 8ER and the operated one of the flip-flop circuits 8S, 8M and 8TB. The circuit 8RER is monostable so that it automatically resets.

The traffic recorder 700 is thereafter ready to proceed to record another line and trunk scan or to handle a new request for service. If an ARS pulse does not occur prior to the next positive pulse from the multivibrator 8TG, the recording of the request for service termination is made and completed before the line and trunk scan can be initiated.

*Terminating call*

The terminating call operation of the line concentrator telephone system is substantially the same as for an originating call. When a terminating call is initiated, the marker 915 receives the calling information from the number group circuit 917 through the connector 916. When the marker 915 receives the calling information, it seizes the line link connector 920 and supplies the called line identity and the horizontal group identity through the connector 920 to the circuit 908. When the circuit 908 receives the terminating call information, it selects an idle trunk connectable to the called line, and initiates an outpulsing operation by operating one of the concentrator control circuits 500–9 and the line selection and test circuit 912. The circuit 908 also provides a terminating call indicating potential over lead 90C to the AND circuit 70C.

If the called line is the line 3L04 connected to concentrator 200, the circuit 908 supplies a control potential over lead 9L2 to open the enabling gate 5HG. Lead 9L2 is also connected through resistor 5R5 to battery 5B6 which provides the normal control potential to gate 5HG. With gate 5HG open, the next timing pulse through lead 4TP from the generator 411 sets the flip-flop circuit 5HGS. When the circuit 5HGS is set, it supplies a control potential through the varistor 5D5 to the control terminal 3 of the inhibiting gate 5CHO. The gate 5CHO, which is normally kept open, as described above, by battery 5B5 connected through resistor 5R2 to the control terminal 3, is part of the service request path from the concentrator 200 so that service requests therefrom are blocked and not recognized. The control potential from circuit 5HGS also operates the switches 5SW in circuits 500–9 to inhibit the recognition of service requests. With switches 5SW operated, the scanning pulses are provided to the line selection and test circuit 912. Responsive to the reception of the scanning pulses through circuit 500 and the called line identity from circuit 912 the circuit 912 outpulses the line identity to the concentrator 200. Thereafter the call is established in exactly the same manner as for an originating call.

When the flip-flop circuit 5HGS operates, it also provides a control potential through the lead 6HGS and the enabled AND circuit 70C to set the flip-flop circuit 7HGS. The circuit 70C is enabled by the circuit 908, as described above, to indicate a terminating call. The flip-flop circuit 7HGS remains set as long as a control potential is provided thereto and resets automatically when the control potential is removed. When the flip-flop circuit 7HGS is operated, it disables the gate 70C and the AND circuit 7ARS and it enables the AND circuit 7HGS1. A line and trunk scan cannot be initiated by the traffic recorder 700 as long as circuit 7ARS is disabled.

If the flip-flop circuit 5HGS in the circuit 500 operates during the time that a line and trunk scan is taking place, the recorder 700 is interrupted. The time sequence chart for an interrupted line and trunk scan is shown in FIG. 20. If the flip-flop circuit 7HGS operates during the time between the first ARS pulse after the flip-flop circuit 7CS is operated and the second reset pulse, the scanning of the subscriber lines 3L00–59 by the recorder 700 is interrupted as the circuits 500–9 are operated to halt the transmission of scanning pulses to the concentrators 200–9 in order to handle the terminating call. With the scanning halted, line busy pulses are not provided to the recorder 700. If a terminating call is received by the concentrator control circuit 500 prior to the operation of the flip-flop circuit 11R2, the flip-flop circuit 7HGS provides a pulse through the AND circuit 7HGS1 which is enabled because the flip-flop circuit 10ARS is set and the flip-flop circuit 11R2 is normal at this time. The pulse through the AND circuit 7HGS1 is supplied to set the flip-flop circuit 7ICS. When the flip-flop circuit 7ICS operates it performs the following functions:

(1) It further disables the AND circuit 7ARS by removing the enabling potential at terminal C6 thereof;

(2) It disables the AND circuit 7T0 by removing the enabling potential at terminal C2 thereof to reset the multivibrator 7T0M;

(3) It disables the AND circuit 11LB by removing the enabling potential at terminal C3 thereof to block the reception of subsequent line busy pulses;

(4) It disables the AND circuit 15DEL by removing an enabling potential from terminal C1 thereof;

(5) It enables the AND circuit 12P1 by providing an enabling potential to its terminal C3; and (6) It enables the AND circuit 12CM by providing an enabling potential to its terminal C2.

As the AND circuit 11LB is disabled no further line busy pulses will be recorded by the recorder circuit 1503. The operation of the flip-flop circuit 7ICS, however, does not interfere with the recording of the reference marks through the AND circuit 12SP. The recorder circuit 1503 thus continues to record the reference potentials supplied from the multivibrator 10MS through the AND circuit 12SP until such time as the second reset pulse occurs when the scanning of the trunks 3T0–9 is to begin. When the next reset pulse is provided to the traffic recorder 700 the trunk scanning sequence is initiated in a manner described above except that when the stepper circuit 12ST steps to its terminal 0 a pulse is provided through the AND circuit 12CM to operate the flip-flop circuit 12CMA. When the flip-flop circuit 12CMA operates, it disables the AND circuit 12PB and it enables the AND circuit 12CSM. The stepper circuit 12ST thereafter proceeds, as described above, until its output terminal is stepped to terminal 9. When the output is stepped or transferred to terminal 9 the flip-flop circuit 12P is operated to disable the AND circuit 12–0 and to enable the AND circuits 12P1 and 12PB. The next ½ millisecond pulse from the multivibrator 10MS is not provided to the reset multivibrator 14RS because the AND circuit 12PB was disabled by the flip-flop circuit 12CMA. When this pulse operates the stepper circuit 12ST to transfer its output to its terminal 0, the output is provided through the AND circuit 12P1 to operate the flip-flop circuit 12PA. When the flip-flop circuit 12PA operates, it enables the AND circuit 12P0 and the AND circuit 12CSM. The next reference potential from the circuit 1502 is provided through the cable 13C2, lead 13RF and the AND circuit 12CSM to the OR circuits 13OR1 and 13OR4 to indicate to the circuit 1502 that the scanning cycle was interrupted.

The next ½ millisecond pulse from the multivibrator 10MS is supplied through the AND circuit 12ST, the AND circuit 12P0 and the OR circuit 14RS1 to the multivibrator 14RS. When the multivibrator 14RS operates, as described above, it resets all the flip-flop circuits except the flip-flop circuit 7CS and resets the stepper circuit 12ST.

The flip-flop circuit 7CS is not reset because the output of the multivibrator 14RS is applied to the reset terminal of the flip-flop circuit 7CS through the AND circuit 15DEL which was disabled, as described above, when the flip-flop circuit 7ICS operated. The reset path through lead 15RS8 to the flip-flop circuit 7CS is opened in this manner so that the flip-flop circuit 7CS remains operated. Consequently the next ARS or readying pulse from the generator 411 initiates a line and trunk scan in a normal manner just as if a clock potential had been provided from the clock control 1501.

What is claimed is:

1. In combination, a plurality of subscriber lines, a plurality of trunks less in number than said plurality of lines, a remote line concentrator for establishing connections between said lines and said trunks, a central office to which said trunks are connected, a line scanning system located partially in said concentrator and partially in said central office for determining the service condition of each of said lines at said concentrator and for supplying an indication of said determined conditions to said central office, means at said central office and controlled by said scanning system for operating said line concentrator, and means at said central office and connected in a mutual lockout arrangement with said operating means for periodically recording some of the service conditions of said lines as received at said central office due to the operation of said scanning system.

2. In combination, a plurality of subscriber lines, a plurality of trunks less in number than said plurality of lines, a remote line concentrator for establishing connections between said lines and said trunks, a central office to which said trunks are connected, a line scanning system located partially in said concentrator and partially in said central office for determining the service condition of each of said lines at said concentrator and for supplying an indication of said determined conditions to said central office, first means at said central office and controlled by said scanning system for operating said line concentrator, a scan control circuit at said central office for periodically sampling the service conditions supplied to said central office by said line scanning system, second means in said scan control circuit for inhibiting the operation of said concentrator operating first means, and means effective during the operation of said first means for inhibiting the operation of said scan control circuit.

3. In a line concentrator telephone system employing a line concentrator for providing connections from a plurality of remotely located subscriber lines having idle, busy and service request conditions to a smaller plurality of trunks connected to a central office, means for cyclically determining the idle, busy and service request conditions of said lines, switching means controlled by said determining means for establishing a talking connection between one of said trunks and a service requesting one of said lines, first means for periodically inhibiting the operation of said switching means and for recording indications of the idle and busy conditions of said lines during the time said switching means is inhibited, and second means effective when said switching means is not inhibited by said first means and responsive to the determination of a service request condition on one of said lines by said determining means for inhibiting the operation of said first means.

4. In a line concentrator telephone system in accordance with claim 3, means effective when a terminating call to one of said subscriber lines is initiated during the time said switching means is inhibited for interrupting the operation of said first means, and means effective after the operation of said interrupting means for operating said switching means.

5. In a telephone system, a central office, a plurality of concentrated trunks connected to said central office, a plurality of subscriber lines, a line concentrator for establishing connections between said lines and said trunks, means partially at said central office and partially at said line concentrator for cyclically scanning said subscriber lines, means at said central office controlled by said scanning means for operating said line concentrator, means at said central office for periodically inhibiting the operation of said operating means, and means at said central office controlled by said scanning means when said operating means is inhibited for sampling and recording the data obtained by said scanning means.

6. In an automatic telephone system wherein a line concentrator is utilized to connect a large plurality of subscriber lines through a small plurality of trunks to a central office, a line scanning system located at said central office for determining the service condition of said subscriber lines, a traffice recorder at said central office comprising means for periodically utilizing said line scanning system for determining and recording the traffic condition of said subscriber lines, a diode matrix scanner, means for applying control currents and also a superaudible tone to said scanner, means in said scanner responsive to a busy condition of any one of said trunks for applying said superaudible tone to said busy trunk, and means in said scanner effective upon the application of said control currents for successively testing the traffic condition of said trunks and for concurrently removing said superaudible tone from a busy tested one of said trunks.

7. In combination a plurality of lines to be scanned having at least two electrical conditions, means for scanning each of said lines to determine its condition, means controlled by said scanning means and effective upon a change of electrical condition at any one of said lines for establishing a talking connection to said changed condition line, means for periodically delaying the operation of said connection establishing means, and means effective when said connection establishing means is delayed for recording the electrical condition of each of said lines.

8. In combination a plurality of lines to be scanned having at least two electrical conditions, means for scanning each of said lines to determine its condition, means controlled by said scanning means and effective upon a change of electrical condition at any one of said lines for establishing a talking connection to said changed condition line, means for periodically delaying the operation of said connection establishing means, means effective during the time said connection establishing means is delayed for recording the electrical condition of each of said lines, and means effective during the operation of said connection establishing means for inhibiting the operation of said delaying means.

9. In a telephone system a plurality of lines, means for cyclically testing each of said lines for the voltage condition thereon, a recording device controlled by said testing means for periodically recording a coded representation of the voltage conditions of said lines, a connector controlled by said testing means for establishing a talking connection to any one of said lines, and a mutual lockout circuit arrangement connecting said recording device with said connector.

10. In combination a plurality of devices to be scanned having at least two conditions, means for cyclically scanning each of said devices to determine its condition, means controlled by said scanning means for periodically recording a coded representation of the condition of each of said devices, means responsive to a change in condition of any one of said devices for interrupting the operation of said scanning means, and means effective during the periodic operation of said recording means for inhibiting the operation of said interrupting means.

11. In a telephone system, a central office, a group of subscriber lines, a line scanner, a plurality of trunks extending from said central office and being less in number than the number of lines in said group, switching means serving said group and located at a distance from said central office for establishing a connection to any one of said lines from said central office, means in said central office controlled by said line scanner for selecting an idle one of said trunks and for operating said switching means to connect said selected trunk to said one line, means controlled by said line scanner for periodically sampling and recording the traffic conditions of said lines and of said trunks, means in said central office effective during the operation of said operating means for inhibiting the operation of said sampling and recording means, and means in said central office effective during the periodic operation of said sampling and recording means for inhibiting the operation of said operating means.

12. In a telephone system, a central office, a group of subscriber lines, a line scanner, a plurality of trunks extending from said central office and being less in number than the number of lines in said group, switching means serving said group and located at a distance from said central office for establishing a connection to any one of said lines from said central office, means in said central office controlled by said line scanner for selecting an idle one of said trunks and for operating said switching means to connect said selected trunk to said one line, means controlled by said line scanner for periodically sampling and recording the traffic conditions of said lines and of said trunks, means in said central office effective during the operation of said operating means for inhibiting the operation of said sampling and recording means, means in said central office effective during the periodic operation of said sampling and recording means for inhibiting the operation of said operating means, means effective upon the initiation of a call to any one of said subscriber lines during the periodic operation of said sampling and recording means for interrupting the operation of said sampling and recording means, means effective upon the initiation of a call to any one of said lines for operating said switching means, and means effective upon the initiation of a call to any one of said subscriber lines between the periodic operations of said sampling and recording means for inhibiting the operation of said sampling and recording means until after a connection is established to said called line.

13. In a telephone system, a central office; a plurality of subscriber lines; a plurality of trunks extending from said central office and being less in number than the number of said plurality of lines; switching means located at a distance from said central office for establishing talking connections between said lines and said trunks; a line scanning system for cyclically determining the service condition of said subscriber lines including a remote unit associated wtih said switching means, a unit in said central office, and means for transferring the determined service conditions from said remote unit to said central office unit; means in said central office controlled by said central office unit of said scanning means for operating said switching means; means in said central office for periodically seizing said central office unit of said scanning system; and means controlled by said seizing means for periodically recording a coded representation of the service conditions of said lines.

14. In a telephone system, a central office; a plurality of subscriber lines; a plurality of trunks extending from said central office and being less in number than the number of said plurality of lines; switching means located at a distance from said central office for establishing talking connections between said lines and said trunks; a line scanning system for cyclically determining the service condition of said subscriber lines including a remote unit associated with said switching means, a unit in said central office, and means for transferring the determined service conditions from said remote unit to said central office unit; means in said central office controlled by said central office unit of said scanning means for operating said switching means; means in said central office for periodically seizing said central office unit of said scanning system; means controlled by said seizing means for periodically recording a coded representation of the service conditions of said lines; and means effective upon the initiation of a call to any one of said subscriber lines during the periodic operation of said seizure means for interrupting the operation of said recording means.

15. In a telephone system, a central office; a plurality of subscriber lines; a plurality of trunks extending from said central office and being less in number than the number of said plurality of lines; switching means located at a distance from said central office for establishing talking connections between said lines and said trunks; a line scanning system for cyclically determining the service condition of said subscriber lines including a remote unit associated with said switching means, a unit in said central office, and means for transferring the determined service conditions from said remote unit to said central office unit; means in said central office controlled by said central office unit of said scanning means for operating said switching means; means in said central office for periodically seizing said central office unit of said scanning system; means controlled by said seizing means for periodically recording a coded representation of the service conditions of said lines; means effective upon the initiation of a call to any one of said lines for operating said switching means; and means effective upon the initiation of a call to any one of said subscriber lines for inhibiting the operation of said recording means.

16. In a telephone system, a central office; a plurality of subscriber lines; a plurality of trunks extending from said central office and being less in number than the number of said plurality of lines; a line scanning system for cyclically determining the service condition of said subscriber lines; switching means located at a distance from said central office for establishing talking connections between said lines and said trunks; means in said central office controlled by said central office unit of said scanning means for operating said switching means; means in said central office for periodically seizing said central office unit of said scanning system; means controlled by said seizing means for periodically recording a coded representation of the service conditions of said lines; means connected to said trunks in said central office and effective after each periodic operation of said recording means for sampling the traffic conditions of said trunks; and means controlled by said sampling means for recording a coded representation of the traffic conditions of said trunks.

17. In a telephone system, a plurality of subscriber lines having idle, busy and service request conditions, a line scanner for cyclically determining the condition of each of said lines, means controlled by said scanner responsive to the determination of a service request condition on any one of said lines for establishing a talking connection to said service requesting line, means for periodically seizing said scanner, and means controlled by said seizure means for recording a coded representation of the idle or busy condition of each of said lines during one cyclic operation of said scanner.

18. In a telephone system, a plurality of subscriber lines having idle, busy and service request conditions, a line scanner for cyclically determining the condition of each of said lines, means controlled by said scanner responsive to the determination of a service request condition on any one of said lines for establishing a talking connection to said service requesting line, means for periodically seizing said scanner, means controlled by said seizure means for recording a coded representation of the idle or busy condition of each of said lines during one cyclic operation of said scanner, and means effective upon the periodic operation of said seizure means for inhibiting the operation of said connection establishing means.

19. In a telephone system, a plurality of subscriber lines having idle, busy and service request conditions, a line scanner for cyclically determining the condition of each of said lines, means controlled by said scanner responsive to the determination of a service request condition on any one of said lines for establishing a talking connection to said service requesting line, means for periodically seizing said scanner, means controlled by said seizure means for recording a coded representation of the idle or busy condition of each of said lines during one cyclic operation of said scanner, and a mutual lockout circuit arrangement connected between said seizure means and said connection establishing means.

20. In a telephone system, a plurality of subscriber lines arranged in concentrator groups, a line concentrator for each of said groups, a central office, a plurality of trunks extending from said central office to each of said concentrators, said plurality of trunks connected to any one of said concentrators being less in number than said plurality of lines connected to said one concentrator, a line scanning system for cyclically and synchronously determining the service conditions of said lines in each of said concentrator groups, means responsive to the determination of a service request condition on any one of said lines in any one of said groups for establishing a talking connection from said service requesting line through the associated one of said concentrators and an idle one of said trunks connected to said associated concentrator to said central office, means effective during the operation of said connection establishing means for halting the operation of said line scanning system, a timing circuit arrangement in said central office, means in said central office controlled by said timing circuit arrangement for periodically seizing said scanning system, means effective during the periodic operation of said seizure means for inhibiting the operating of said connection establishing means, means in said central office for selecting any one of said concentrators, and means controlled by said selecting means and said seizure means for recording a coded representation of the condition of said lines connected to said selected concentrator.

21. In combination a plurality of subscriber lines having idle and busy conditions, means for periodically recording a coded representation of the condition of each of said lines, means responsive to a change in condition of any one of said lines for preventing the operation of said recording means, and means effective during the periodic operation of said recording means for inhibiting the operation of said preventing means.

22. In a telephone system, a plurality of subscriber lines having idle, busy and service request conditions, means responsive to a service request condition on any one of said lines for establishing a connection to said service requesting line, means for periodically recording a coded representation of the idle or busy condition of each of said lines, and means effective when a call is initiated to any one of said lines for interrupting the operation of said recording means and for establishing a connection to said called line.

23. In a telephone system, a plurality of subscriber lines having idle, busy and service request conditions, means responsive to a service request condition on any one of said lines for establishing a connection to said service requesting line, means for periodically recording a coded representation of the idle or busy condition of each of said lines, and means effective during the time a connection is being established to said service requesting line for preventing the operation of said recording means.

24. In combination a plurality of lines, a central office, a plurality of trunks extending from said central office, a remotely located concentrator for establishing connections between said lines and said trunks, means effective when a connection is established by said concentrator for supplying a superaudible signal to said trunk utilized for said established connection, and means at said central office for periodically sampling the service conditions of said trunks including means controlled by said superaudible signal supplying means for determining the identity of said trunks utilized for intraconcentrator calls.

References Cited in the file of this patent

UNITED STATES PATENTS

| | | |
|---|---|---|
| 2,115,801 | Collis | May 3, 1938 |
| 2,393,403 | Ostline | Jan. 22, 1946 |
| 2,812,385 | Joel et al. | Nov. 5, 1957 |
| 2,820,099 | Gorgas et al. | Jan. 14, 1958 |
| 2,850,577 | Krom et al. | Sept. 2, 1958 |